US008671163B2

(12) United States Patent
Luby et al.

(10) Patent No.: US 8,671,163 B2
(45) Date of Patent: *Mar. 11, 2014

(54) MULTI-OUTPUT PACKET SERVER WITH INDEPENDENT STREAMS

(75) Inventors: Michael Luby, Berkeley, CA (US);
Ronen Vainish, Sunnyvale, CA (US);
Lars Rasmussen, San Francisco, CA (US); David Kushi, San Francisco, CA (US); Serban Simu, San Jose, CA (US);
Adrian Perrig, Berkeley, CA (US);
Roberto Attias, Richmond, CA (US);
Michael Walfish, San Francisco, CA (US); Diane Hernek, Oakland, CA (US); John Byers, Newton, MA (US)

(73) Assignee: Digital Fountain, Inc., San Diego, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/449,663

(22) Filed: Apr. 18, 2012

(65) Prior Publication Data

US 2012/0203872 A1     Aug. 9, 2012

Related U.S. Application Data

(63) Continuation of application No. 11/679,170, filed on Feb. 26, 2007, now Pat. No. 8,185,809, which is a continuation of application No. 09/882,508, filed on Jun. 15, 2001, now abandoned.

(60) Provisional application No. 60/274,445, filed on Mar. 9, 2001.

(51) Int. Cl.
*G06F 15/167*     (2006.01)

(52) U.S. Cl.
USPC ............................ 709/219; 709/203; 709/246

(58) Field of Classification Search
USPC .......................................... 709/219, 203, 246
See application file for complete search history.

(56) References Cited

U.S. PATENT DOCUMENTS

| 5,371,532 A | 12/1994 | Gelman et al. |
| 5,379,297 A | 1/1995 | Glover et al. |

(Continued)

FOREIGN PATENT DOCUMENTS

| WO | 0157667 A1 | 8/2001 |
| WO | 0158130 A2 | 8/2001 |
| WO | 0158131 A2 | 8/2001 |

OTHER PUBLICATIONS

Aggarwal, C. et al.: "A Permutation-Based Pyramid Broadcasting Scheme for Video-on-Demand Systems," Proc. IEEE Int'l Conf. on Multimedia Systems, pp. 118-126 (1996).

(Continued)

*Primary Examiner* — Nicholas Taylor

(57) ABSTRACT

A method of serving content to multiple clients via a network is provided. Independent sessions with each of a plurality of clients are maintained, wherein the number of clients in the plurality of clients can vary over time, and wherein the start of each session and the end of each session can be independent of the start and end of other sessions. A stream of packet payloads is received, each packet payload of the stream of packet payloads including data generated from the content, wherein each packet payload in at least a subset of the stream of packet payloads includes a different set of data. Each packet payload in the stream of packet payloads is transmitted to each client of the plurality of clients in corresponding packets, wherein the packet payload transmitted to a client at any particular time is independent of the state of the corresponding session.

20 Claims, 19 Drawing Sheets

(56) References Cited

U.S. PATENT DOCUMENTS

| | | | |
|---|---|---|---|
| 5,617,541 A | 4/1997 | Albanese et al. | |
| 5,659,614 A | 8/1997 | Bailey, III | |
| 5,751,336 A | 5/1998 | Aggarwal et al. | |
| 5,771,239 A | 6/1998 | Moroney et al. | |
| 5,778,187 A | 7/1998 | Monteiro et al. | |
| 5,835,165 A | 11/1998 | Keate et al. | |
| 5,870,412 A | 2/1999 | Schuster et al. | |
| 5,903,775 A | 5/1999 | Murray | |
| 5,928,331 A | 7/1999 | Bushmitch | |
| 5,936,659 A | 8/1999 | Viswanathan et al. | |
| 5,936,949 A | 8/1999 | Pasternak et al. | |
| 5,948,061 A | 9/1999 | Merriman et al. | |
| 5,991,308 A | 11/1999 | Fuhrmann et al. | |
| 6,011,590 A | 1/2000 | Saukkonen | |
| 6,018,359 A | 1/2000 | Kermode et al. | |
| 6,018,766 A | 1/2000 | Samuel et al. | |
| 6,073,250 A | 6/2000 | Luby et al. | |
| 6,081,909 A | 6/2000 | Luby et al. | |
| 6,122,379 A | 9/2000 | Barbir | |
| 6,141,053 A | 10/2000 | Saukkonen | |
| 6,141,788 A | 10/2000 | Rosenberg et al. | |
| 6,163,870 A | 12/2000 | Luby et al. | |
| 6,185,265 B1 | 2/2001 | Campanella | |
| 6,189,039 B1 | 2/2001 | Harvey et al. | |
| 6,195,777 B1 | 2/2001 | Luby et al. | |
| 6,243,369 B1 | 6/2001 | Grimwood et al. | |
| 6,256,673 B1 | 7/2001 | Gayman | |
| 6,307,487 B1 | 10/2001 | Luby | |
| 6,320,520 B1 | 11/2001 | Luby | |
| 6,370,669 B1 | 4/2002 | Eroz et al. | |
| 6,373,406 B2 | 4/2002 | Luby | |
| 6,377,972 B1 | 4/2002 | Guo et al. | |
| 6,411,223 B1 | 6/2002 | Haken et al. | |
| 6,421,387 B1 | 7/2002 | Rhee | |
| 6,430,722 B1 | 8/2002 | Eroz et al. | |
| 6,434,606 B1 | 8/2002 | Borella et al. | |
| 6,434,619 B1 | 8/2002 | Lim et al. | |
| 6,434,620 B1 | 8/2002 | Boucher et al. | |
| 6,486,803 B1 * | 11/2002 | Luby et al. | 341/50 |
| 6,502,135 B1 | 12/2002 | Munger et al. | |
| 6,594,793 B1 | 7/2003 | Guey | |
| 6,614,366 B2 | 9/2003 | Luby | |
| 6,665,357 B1 | 12/2003 | Somayazulu | |
| 6,674,740 B1 | 1/2004 | Siala | |
| 6,678,263 B1 | 1/2004 | Hammons, Jr. et al. | |
| 6,732,325 B1 | 5/2004 | Tash et al. | |
| 6,788,654 B1 | 9/2004 | Hashimoto et al. | |
| 6,909,383 B2 | 6/2005 | Shokrollahi et al. | |
| 6,934,388 B1 | 8/2005 | Clark | |
| 6,987,770 B1 | 1/2006 | Yonge, III | |
| 7,057,534 B2 | 6/2006 | Luby | |
| 7,068,729 B2 | 6/2006 | Shokrollahi et al. | |
| 7,072,971 B2 * | 7/2006 | Lassen et al. | 709/230 |
| 7,092,457 B1 | 8/2006 | Chugg et al. | |
| 7,096,404 B2 | 8/2006 | Eroz et al. | |
| 7,139,960 B2 | 11/2006 | Shokrollahi | |
| 7,233,264 B2 | 6/2007 | Luby | |
| 7,240,358 B2 | 7/2007 | Horn et al. | |
| 7,293,222 B2 | 11/2007 | Shokrollahi et al. | |
| 7,310,733 B1 | 12/2007 | Pearson et al. | |
| 7,394,407 B2 | 7/2008 | Shokrollahi et al. | |
| 7,412,641 B2 | 8/2008 | Shokrollahi et al. | |
| 7,418,651 B2 | 8/2008 | Luby et al. | |
| 7,451,377 B2 | 11/2008 | Shokrollahi et al. | |
| 7,512,697 B2 | 3/2009 | Lassen et al. | |
| 7,529,713 B1 | 5/2009 | Donner | |
| 7,532,132 B2 | 5/2009 | Shokrollahi et al. | |
| 7,657,913 B2 | 2/2010 | Pedlow, Jr. | |
| 7,711,068 B2 | 5/2010 | Shokrollahi et al. | |
| 7,720,174 B2 | 5/2010 | Shokrollahi et al. | |
| 7,721,184 B2 | 5/2010 | Luby et al. | |
| 7,812,743 B2 | 10/2010 | Luby | |
| 7,840,178 B2 | 11/2010 | Hellman | |
| 7,916,746 B2 | 3/2011 | Yonge et al. | |
| 7,971,129 B2 | 6/2011 | Watson et al. | |
| 8,131,867 B1 | 3/2012 | Luby | |
| 8,185,809 B2 | 5/2012 | Luby et al. | |
| 2001/0039636 A1 * | 11/2001 | Hammons et al. | 714/752 |
| 2002/0075824 A1 * | 6/2002 | Willekes et al. | 370/329 |
| 2002/0080824 A1 | 6/2002 | Wingrove | |
| 2002/0087685 A1 | 7/2002 | Lassen et al. | |
| 2002/0114283 A1 | 8/2002 | Lee | |
| 2002/0129159 A1 | 9/2002 | Luby et al. | |
| 2002/0157058 A1 | 10/2002 | Ariel et al. | |
| 2002/0190878 A1 | 12/2002 | Luby | |
| 2003/0058958 A1 | 3/2003 | Shokrollahi et al. | |
| 2004/0021588 A1 | 2/2004 | Luby | |
| 2004/0075592 A1 | 4/2004 | Shokrollahi et al. | |
| 2004/0075593 A1 | 4/2004 | Shokrollahi et al. | |
| 2005/0010847 A1 | 1/2005 | Shokrollahi et al. | |
| 2005/0102598 A1 | 5/2005 | Shokrollahi | |
| 2005/0219070 A1 | 10/2005 | Shokrollahi | |
| 2005/0242974 A1 | 11/2005 | Shokrollahi et al. | |
| 2005/0257106 A1 | 11/2005 | Luby et al. | |
| 2006/0023732 A1 | 2/2006 | Vedantham et al. | |
| 2006/0036930 A1 | 2/2006 | Luby et al. | |
| 2006/0087456 A1 | 4/2006 | Luby | |
| 2006/0129692 A1 | 6/2006 | Lassen et al. | |
| 2006/0262877 A1 | 11/2006 | Shokrollahi et al. | |
| 2006/0276196 A1 | 12/2006 | Jiang et al. | |
| 2007/0101234 A1 | 5/2007 | Shokrollahi | |
| 2007/0195894 A1 | 8/2007 | Shokrollahi et al. | |
| 2007/0233891 A1 | 10/2007 | Luby et al. | |
| 2007/0300127 A1 | 12/2007 | Watson et al. | |
| 2008/0034273 A1 | 2/2008 | Luby | |
| 2008/0086751 A1 | 4/2008 | Horn et al. | |
| 2008/0175265 A1 | 7/2008 | Yonge et al. | |
| 2008/0180284 A1 | 7/2008 | Luby | |
| 2008/0180285 A1 | 7/2008 | Shokrollahi et al. | |
| 2010/0313096 A1 | 12/2010 | Lee | |

OTHER PUBLICATIONS

Aggarwal, C. et al.: "On Optimal Batching Policies for Video-on-Demand Storage Servers," Multimedia Systems, vol. 4, No. 4, pp. 253-258 (1996).

Almeroth, et al., "The use of multicast delivery to provide a scalable and interactive video-on-demand service", IEEE Journal on Selected Areas in Communication, 14(6): 1110-1122, (1996).

Bar-Noy, et al., "Competitive on-line stream merging algorithms for media-on-demand", Draft (Jul. 2000), pp. 1-34.

Bar-Noy et al. "Efficient algorithms for optimal stream merging for media-on-demand," Draft (Aug. 2000), pp. 1-43.

Dan, A. et al.: "Scheduling Policies for an On-Demand Video Server with Batching," Proc. ACM Multimedia, pp. 15-23 (Oct. 1998).

Eager, et al. "Minimizing bandwidth requirements for on-demand data delivery," Proceedings of the International Workshop on Advances in Multimedia Information Systems, p. 80-87 (Indian Wells, CA Oct. 1999).

Eager, et al., "Optimal and efficient merging schedules for video-on-demand servers", Proc. ACM Multimedia, vol. 7, pp. 199-202 (1999).

Gao, L. et al.: "Efficient Schemes for Broadcasting Popular Videos," Proc. Inter. Workshop on Network and Operating System Support for Digital Audio and Video, pp. 1-13 (1998).

Hua, et al., "Skyscraper broadcasting: A new broadcsting system for metropolitan video-on-demand systems", Proc. ACM SIGCOMM, pp. 89-100 (Cannes, France, 1997).

International Preliminary Examination Report, PCT/US2002/006841—International Preliminary Examining Authority—US, Feb. 21, 2003.

International Search Report, PCT/US2002/006841—International Search Authority—US, Mar. 17, 2002.

Juhn, L. et al.: "Adaptive Fast Data Broadcasting Scheme for Video-on-Demand Service," IEEE Transactions on Broadcasting, vol. 44, No. 2, pp. 182-185 (Jun. 1998).

Juhn, L. et al.: "Harmonic Broadcasting for Video-on-Demand Service," IEEE Transactions on Broadcasting, vol. 43, No. 3, pp. 268-271 (Sep. 1997).

Ozden, et al.: "A low-cost storage service for movie-on-demand service," Proceedings of the 20th Very Large DataBases (VLDB) Conference (Santiago, Chile 1994).

(56) References Cited

OTHER PUBLICATIONS

Paris, et al., "A low bandwidth broadcasting protocol for video on demand", Proc. International Conference on Computer Communications and Networks, vol. 7, pp. 690-697 (Oct. 1998).

Paris, et al., "Efficient broadcasting protocols for video on demand", International Symposium on Modeling, Analysis and Simulation of Computer and Telecommunication systems (MASCOTS), vol. 6, pp. 127-132 (Jul. 1998).

Rangan, et al., "Designing an On-Demand Multimedia Service," IEEE Communication Magazine, vol. 30, pp. 56-64, (Jul. 1992).

Sincoskie, W. D., "System Architecture for Large Scale Video on Demand Service," Computer Network and ISDN Systems, pp. 155-162, (1991).

Viswanathan, et al., "Metropolitan area video-on-demand services using pyramid broadcasting", Multimedia Systems, 4(4): 197-208 (1996).

Viswanathan, et al., "Pyramid Broadcasting for Video-on-Demand Service", Proceedings of the SPIE Multimedia Computing and Networking Conference, vol. 2417, pp. 66-77 (San Jose, CA, Feb. 1995).

Viswanathan, Subramaniyam R., "Publishing in Wireless and Wireline Environments," Ph. D Thesis, Rutgers, The State University of New Jersey (Nov. 1994), 180pages.

Wong, J.W., "Broadcast delivery", Proceedings of the IEEE, 76(12): 1566-1577, (1988).

Co-pending U.S. Appl. No. 09/587,542, filed Jun. 1, 2000.

\* cited by examiner

MULTI-OUTPUT PACKET SERVER WITH INDEPENDENT STREAMS

CROSS-REFERENCES TO RELATED APPLICATIONS

This application is a continuation of U.S. patent application Ser. No. 11/679,170, filed Feb. 26, 2007, entitled "MULTI-OUTPUT PACKET SERVER WITH INDEPENDENT STREAMS," which is a continuation of U.S. patent application Ser. No. 09/882,508, filed Jun. 15, 2001, entitled "MULTI-OUTPUT PACKET SERVER WITH INDEPENDENT STREAMS," which claims the benefit of priority to U.S. Provisional Patent Application No. 60/274,445, filed Mar. 9, 2001, entitled "MULTI-OUTPUT PACKET SERVER WITH INDEPENDENT STREAMS," each of which is herein incorporated by reference in its entirety for all purposes.

FIELD OF THE INVENTION

The present invention generally relates to communications systems. In particular, the present invention relates to methods and apparatus for delivering content in communications systems to multiple locations.

BACKGROUND OF THE INVENTION

Digital content transmission between a server and multiple receivers over a communications channel has been the subject of much literature. In general, a design goal of a content delivery system is to allow each recipient to receive an exact copy of content transmitted over a channel by a server with some level of certainty. Hereafter, content may be a file, a stream of data or some other form of data. A content delivery system may have to serve as many different contents as there are active receivers, as each receiver may demand a different content. In addition, where different receivers request the same content at different points in time, a concern is how to efficiently serve the content to each receiver. Potentially each client may require an independent stream of the content it requested, where a stream is the flow of data from the server required by that client in order to download the content.

In this context, a content delivery protocol is defined to be an end-to-end protocol that is enacted between a sender and a receiver that is used to deliver contents to the receiver from the sender. An example of such a protocol is Transmission Control Protocol/Internet Protocol (TCP/IP). There are two fundamental services that any content delivery protocol should provide: reliability and flow/congestion control. For download applications, reliability comprises making sure that each receiving client eventually receives a bit-by-bit precise copy of the content. Flow/congestion control for time insensitive download applications comprises making sure that the rate at which data is sent to a receiver is as fast as possible but not at such a fast rate that the intermediate routers and buffers (including the receiving buffer of the client machine) are overwhelmed with too much data too fast and overflow.

For streaming applications, reliability comprises making sure that each receiving client can play out as high of quality rendition of the original stream of data or file as possible. Flow/congestion control for streaming should try to ensure that the reception rate of a receiving client is fast enough to allow the client to play out the stream at high quality with minimal or no interruptions.

Flow/congestion control must also take into account that the intervening network between the sender and the receivers is a shared network, and thus the flow/congestion control must react dynamically to changing conditions in the network due to other flows.

The most widely used Internet content delivery protocol today is TCP/IP. TCP/IP is a protocol that provides the services for reliability and flow/congestion control. A TCP sender partitions content to be delivered into input symbols that can fit into the payload of a TCP/IP packet, and each input symbol is included in a TCP/IP packet that additionally includes an indication of which input symbol the packet contains (e.g., a sequence number). The packets are then routed to their destination. Upon receipt of each such packet, a TCP receiver sends an acknowledgment back to the TCP sender indicating which input symbols the TCP receiver has fully received. Based on this feedback, the TCP sender can determine if the TCP receiver is missing any input symbols that have been sent. Over time, when there are no missing input symbols, the TCP sender continually increases the rate at which it sends packets. When sent packet(s) are not acknowledged by the TCP receiver, the TCP sender slows down the sending rate of packets significantly and also resends the packet(s) containing the missing input symbols. Thus, the acknowledgments sent from the TCP receiver to the TCP sender are used both to adjust the sending rate of packets (flow/congestion control) and to decide which input symbols to resend because they were not yet received (reliability).

Furthermore, TCP/IP performs the functions of making a connection, maintaining the connection, and terminating the connection between a TCP sender and TCP receiver.

Traditional web servers and some traditional streaming servers are based on the standardized TCP/IP protocol. FIG. 1 illustrates a traditional TCP/IP-based server 100. The server 100 includes a disk 120 that stores content to be delivered and a plurality of TCP senders 110, each coupled to a network 130. Each TCP sender 110 is associated with a connected client (not shown), and each TCP sender 110 sends packets via the network 130 to a TCP receiver on the corresponding client machine. Additionally, each TCP sender 110 must keep track of and maintain a fairly large amount of TCP state information. The TCP senders 110 each send their corresponding client a potentially different set of input symbols at the same point in time even if all clients are downloading or streaming the same content. The constraints on a web or streaming server 100 include the amount of memory used by each TCP sender 110. For example the memory dedicated to each sender 110 could be by default 64 KB, but the memory needed for each sender 110 can be much larger when the sending rate is high. For example, a sender 110 sending packets at 10 Mbps on a connection that has a 1 second round trip time to the TCP receiver will need over 1 MB of memory dedicated to the TCP sender 110 in order to store the required one round trip time of packets in flight. Another constraint of interest is the contending disk access for the different TCP senders. For example, if one hundred clients are downloading or streaming the same large content that is, for example, 1 GB in length from the server 100, and the clients started the download or stream at staggered times, then the one hundred TCP senders 110 would need to concurrently read from different portions of the disk 120. If the number of clients is instead 1,000 then the disk contention problem is ten times worse. Furthermore, the CPU resources of the server must be shared among all TCP senders 110. Thus, all TCP senders 110 on a traditional web or streaming server 100 are all competing for the same limited server resources, and thus the capacity of a server 100 to serve concurrently connected clients is linearly related to the amount of resources available on the server. Furthermore, if any of these resources is a bottleneck, then this resource will dictate the capacity of the server in terms of concurrent client downloads or streams.

Beyond all the issues listed above that affect both TCP/IP-based web and streaming servers, traditional TCP/IP-based streaming servers have the additional concern that each client should be served at a rate that is at least the playback rate of the stream in order to avoid unwanted stoppages in the playback of the stream at the client. Thus, consistent sending above a minimal rate is a more important requirement for a streaming server than it is for a web server for download applications. Primarily for this scalability reason, streaming servers use User Datagram Protocol (UDP) whenever possible with either unicast or multicast connections to the clients.

Using UDP introduces a number of other concerns, including that of flow/congestion control and reliability. A simple use of UDP is to transmit the raw stream in packets to all clients at a fixed rate. One issue with this approach is that such a transmission is not reactive to congestion in the network, and may cause the intervening networking infrastructure to overload. Such an overload may cause massive packet loss and may negatively impact other connections sharing the same network infrastructure. Another concern is that such a transmission is not protected against losses, and thus even when a substantial fraction of packets do arrive at clients, the play out quality may be quite poor when there are packet losses containing important piece of the original stream. For example, with Moving Picture Experts Group (MPEG) streams, the loss of packets containing I-frames may cause many frames of the play out to display incorrectly.

In several other works, an approach has been introduced for ensuring reliable content delivery using FEC codes such as Reed-Solomon codes or Tornado codes, or chain reaction codes which are information additive codes. The basic idea is to send output symbols generated from the content instead of just the input symbols that constitute the content. Erasure correcting codes, such as Reed-Solomon or Tornado codes generate a fixed number of output symbols for a fixed length content. For example, for K input symbols, N output symbols might be generated. These N output symbols may comprise the K original input symbols and N-K redundant symbols. If storage permits, then the server can compute the set of output symbols for each content only once and transmit the output symbols using a carousel protocol.

More recently, chain reaction coding systems have been developed for use in content transmission systems. U.S. Pat. No. 6,307,487, U.S. Pat. No. 6,320,520, U.S. Pat. No. 6,486,803 and U.S. Pat. No. 6,411,223 describe various chain reaction coding systems in detail. As described therein, a chain reaction encoder generates output symbols from input symbols of the content as needed. The server can continuously generate output symbols for each content being served.

For traditional FEC codes, the number of possible output symbols that can be generated is of the same order of magnitude as the number of input symbols the content is partitioned into. Typically, most or all of these output symbols are generated in a preprocessing step before the sending step. These output symbols have the property that all the input symbols can be regenerated from any subset of the output symbols equal in length to the original content or slightly longer in length than the original content. For chain reaction codes, the pool of possible output symbols that can be generated is orders of magnitude larger than the number of the input symbols, and a random output symbol from the pool of possibilities can be generated very quickly. For chain reaction codes, the output symbols can be generated on the fly on an as needed basis concurrent with the sending step. Chain reaction codes have the property that all input symbols of the content can be regenerated from any subset of a set of randomly generated output symbols slightly longer in length than the original content.

Therefore, what is needed is a server that does not require excessive computing power or memory at a sender to implement, and that can be used to efficiently distribute a plurality of contents that are continuously being encoded.

BRIEF SUMMARY OF THE INVENTION

In one embodiment according to the present invention, a method of serving content to multiple clients via a network is provided. The method comprises maintaining independent sessions with each of a plurality of clients, wherein the number of clients in the plurality of clients can vary over time, and wherein the start of each session and the end of each session can be independent of the start and end of other sessions. The method also comprises receiving a stream of packet payloads, each packet payload of the stream of packet payloads including data generated from the content, wherein each packet payload in at least a subset of the stream of packet payloads includes a different set of data. The method additionally comprises transmitting each packet payload in the stream of packet payloads to each client of the plurality of clients in corresponding packets, wherein the packet payload transmitted to a client at any particular time is independent of the state of the corresponding session.

In another embodiment, an apparatus for serving content to multiple clients via a network is provided. The apparatus includes a client manager coupled to the network that maintains independent sessions with each of a plurality of clients. The apparatus additionally includes a buffer coupled to receive a stream of packet payloads, each packet payload of the stream of packet payloads including data generated from the content, wherein each packet payload in at least a subset of the stream of packet payloads includes a different set of data. The apparatus also includes a replication engine coupled to the buffer that, for each packet payload, generates a plurality of packets that include the packet payload, each packet of the plurality of packets corresponding to one of the plurality of clients. The apparatus further includes a transmitter coupled to the replication engine that receives the packets and transmits the packets to the corresponding clients via the network, wherein the packet payload transferred to a client at any particular time is independent of the state of the corresponding session.

In yet another embodiment, a method of serving content to multiple clients via a network, the content represented by a plurality of input symbols, wherein the network includes a multicast network, is provided. The method comprises generating output symbols from the input symbols, and assembling output symbols into a stream of packets, wherein each packet in the stream of packets includes a set of at least one output symbol, wherein each packet includes a different set of the output symbols. The method also comprises transmitting, using multicasting, the stream of packets to a plurality of multicast clients via the multicast network, wherein the number of multicast clients in the plurality of multicast clients can vary over time, and wherein a multicast client can regenerate the ordered set of input symbols to a desired accuracy from any N output symbols included in a set of packets received by the multicast client, wherein N is an integer greater than 1 and less than the number of possible output symbols.

In still another embodiment, a server for serving content to multiple clients via a network including a multicast network is provided. The server includes a storage device that stores the content to be served, the content including input symbols, and an encoding generator coupled with the storage device that generates output symbols from of the input symbols. The server also includes a transmitter coupled with the encoding generator and with the network that assembles the output symbols into multicast packets, wherein each multicast packet includes a different set of output symbols and transmits, using multicast, the multicast packets to a plurality of multicast clients via the network, wherein the number of multicast clients in the plurality of multicast clients can vary over time, and wherein a multicast client can regenerate the input symbols to a desired accuracy from any N output symbols included in a set of multicast packets received by the multicast client, wherein N is an integer greater than 1 and less than the number of possible output symbols.

In another embodiment, an apparatus for serving content to multiple clients via a network, the network including a multicast network, is provided. The apparatus comprises a client manager coupled to the network that maintains independent sessions with each of a plurality of unicast clients. The apparatus additionally comprises a storage device that stores the content to be served, and an encoding system coupled to the storage device that generates a stream of packet payloads, each packet payload of the stream of packet payloads including data comprising the content to be served to the plurality of unicast clients and a plurality of multicast clients, wherein each packet payload in at least a subset of the stream of packet payloads includes a different set of data, wherein at least a first subset of the packet payloads are included in multicast packets. The apparatus also comprises a multicast transmitter coupled with the encoding generator and the network that receives the multicast packets from the encoding system and transmits the multicast packets to a plurality of multicast clients via the multicast network, and a replication engine coupled to the encoding system that receives at least a second subset of the packet payloads in the stream of packet payloads, and that, for each received packet payload, generates a plurality of unicast packets that include the received packet payload, each unicast packet of the plurality of unicast packets corresponding to one of the plurality of unicast clients. The apparatus further comprises a unicast transmitter coupled to the replicator engine that receives the unicast packets and transmits the packets to the corresponding clients via the network, wherein the packet payload transferred to a unicast client at any particular time is independent of the state of the corresponding session.

In yet another embodiment, a distributed apparatus for serving content to multiple clients via a network is provided. The distributed apparatus includes a plurality of replication systems. Each replication system includes a respective client manager coupled to the network that maintains independent sessions with each of a respective plurality of clients. Each replication system also includes a respective buffer coupled to receive a respective stream of packet payloads, each packet payload of the respective stream of packet payloads including data comprising the content to be transferred to the respective plurality of clients, wherein each packet payload in at least a subset of the respective stream of packet payloads includes a different set of data, and a respective replication engine coupled to buffer that, for each packet payload, generates a plurality of packets that include the packet payload, each packet of the plurality of packets corresponding to one of the respective plurality of clients. Each replication system additionally includes a respective transmitter coupled to the replication engine that receives the packets and transmits the packets to the corresponding clients via the network, wherein the packet payload transferred to a client at any particular time is independent of the state of the corresponding session.

In still another embodiment, a server system for serving content to multiple clients via a network including a multicast network is provided. The server system comprises a plurality of servers. Each of the plurality of servers includes a respective storage device that stores the content to be served, the content including input symbols, and a respective encoding generator coupled with the respective storage device that generates output symbols from the input symbols. Each of the plurality of servers also includes a respective transmitter coupled with the respective encoding generator and with the network that assembles the output symbols into multicast packets, wherein each multicast packet includes a different set of output symbols and transmits, using multicast, the multicast packets to a respective plurality of multicast clients via the network, wherein the number of multicast clients in the respective plurality of multicast clients can vary over time, and wherein a multicast client can regenerate the input symbols to a desired accuracy from any N output symbols included in a set of multicast packets received by the multicast client, wherein N is an integer greater than 1 and less than the number of possible output symbols.

In another aspect according to the invention, a method at a client of receiving content comprising an ordered set of input symbols via a network is provided. The method includes requesting a server via the network to transmit the content to the client, and receiving a stream of packets from the server via the network, wherein packets in the stream of packets comprise output symbols, the output symbols generated from the input symbols, wherein each packet in the stream of packets includes a different set of the output symbols, wherein the number of possible output symbols is N. The method also includes, after receiving N1 output symbols in packets received from the stream of packets, wherein N1 is a positive integer greater than 1 and less than N, regenerating the content to a desired accuracy with the received output symbols.

In another embodiment, a method at a client of receiving content comprising an ordered set of input symbols via a multicast network is provided. The method comprises joining a multicast session, and receiving a stream of packets via the multicast network, wherein packets in the stream of packets comprise output symbols, the output symbols generated from the input symbols, wherein each packet in the stream of packets includes a different set of the output symbols, wherein the number of possible output symbols is N. The method also comprises, after receiving N1 output symbols in packets received from the stream of packets, wherein N1 is a positive integer greater than 1 and less than N, regenerating the content to a desired accuracy with the received output symbols.

In yet another embodiment, a method of receiving content from a server is provided. The method includes requesting to join a multicast session, wherein the multicast session includes a stream of multicast packets served by a server, the multicast packets in the stream of multicast packets including data comprising the content, and if the client does not receive multicast packets in the stream of multicast packets, requesting the server to send a stream of unicast packets, the unicast packets in the stream of unicast packets including data comprising the content.

A further understanding of the nature and the advantages of the inventions disclosed herein may be realized by reference to the remaining portions of the specification and the attached drawings.

DESCRIPTION OF THE SPECIFIC EMBODIMENTS

The present disclosure references the following applications, the entire disclosures of which are herein incorporated by reference for all purposes:

More recently, chain reaction coding systems have been developed for use in content transmission systems. U.S. Pat. No. 6,486,803 and U.S. Pat. No. 6,411,223 describe various chain reaction coding systems in detail. As described therein, a chain reaction encoder generates output symbols from input symbols of the content as needed. The server can continuously generate output symbols for each content being served.

(1) U.S. Pat. No. 6,307,487 entitled "Information Additive Code Generator and Decoder for Communication Systems" (hereinafter "Luby I");

(2) U.S. Pat. No. 6,320,520 entitled "Information Additive Group Code Generator and Decoder for Communication Systems" (hereinafter "Luby II");

(3) U.S. Pat. No. 8,131,867 entitled "Dynamic Layer Congestion Control for Multicast Transport" (hereinafter "Dynamic Layering Application");

(4) U.S. Pat. No. 6,486,803 entitled "On Demand Encoding with a Window" (hereinafter "Windowing Application");

(5) U.S. Pat. No. 6,411,223 entitled "Generating High Weight Output symbols Using a Basis" (hereinafter "High Weight Application");

(6) U.S. Pat. No. 7,072,971 entitled "Scheduling of Multiple Files for Serving on a Server" (hereinafter "Multiple Files Application"); and (7) U.S. Pat. No. 7,240,358 entitled "Methods And Apparatus For Scheduling, Serving, Receiving Media-On-Demand For Clients, Servers Arranged According To Constraints On Resources" (hereinafter "Media On-Demand Application").

The above-referenced applications provide teachings of systems and methods that may be employed in certain embodiments according to the present invention. It is to be understood, however, that these systems and methods are not required of the present invention, and many other variations, modifications, or alternatives may also be used.

General Overview

The present disclosure introduces a new type of server for content delivery, which we hereinafter refer to as a "hydra server". The underlying design of the hydra server is quite different than that for a traditional web server or streaming server. The present disclosure also introduces a corresponding client for a hydra server, which we hereinafter refer to as a "hydra client".

Figure 1:
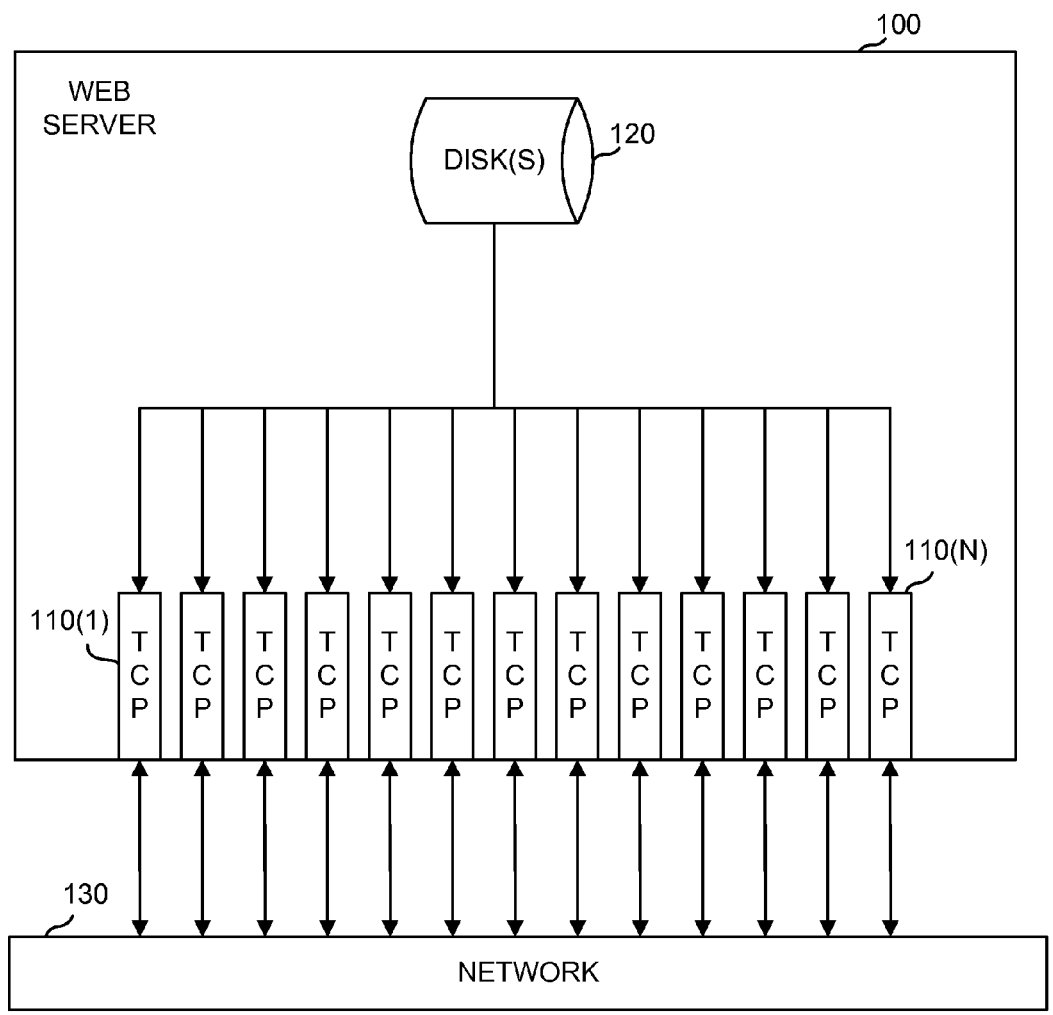
FIG. 1 is a block diagram of how a conventional web server or streaming server uses TCP/IP to serve content to multiple clients.
Figure 2:
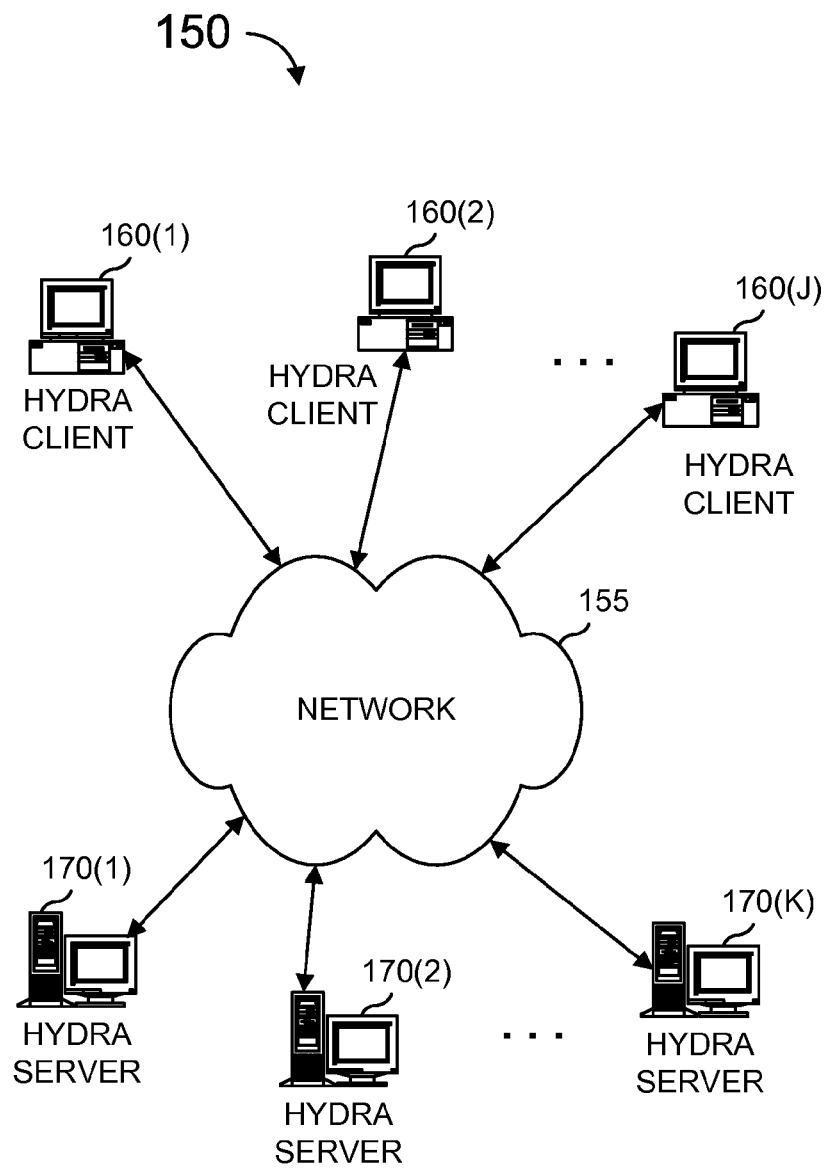
FIG. 2 is a simplified diagram illustrating one environment in which embodiments of the present invention may operate.

FIG. 2 is a simplified diagram illustrating one environment in which embodiments of the present invention may operate. This diagram is used herein for illustrative purposes only and is not intended to limit the scope of the invention. The environment includes a network 155 such as, for example, an internet, the Internet, an intranet, an extranet, a local area network, a wide area network, etc. Coupled with the network 155 are a plurality of hydra clients 160 and one or more hydra servers 170. As is described in more detail below, hydra clients 160 may reliably receive content served by one or more of the hydra servers 170 via the network 155. Depending upon the particular embodiment and upon characteristics of the network 155, a hydra client 160 may receive the content via one or more unicast connections, one or more multicast connections, or a combination of unicast connection(s) and multicast connection(s). Additionally, in certain embodiments, a hydra client 160 may receive the content from one hydra server 170, or more than one of the hydra servers 170.

Hydra Server Fundamental Systems

Figure 3A:
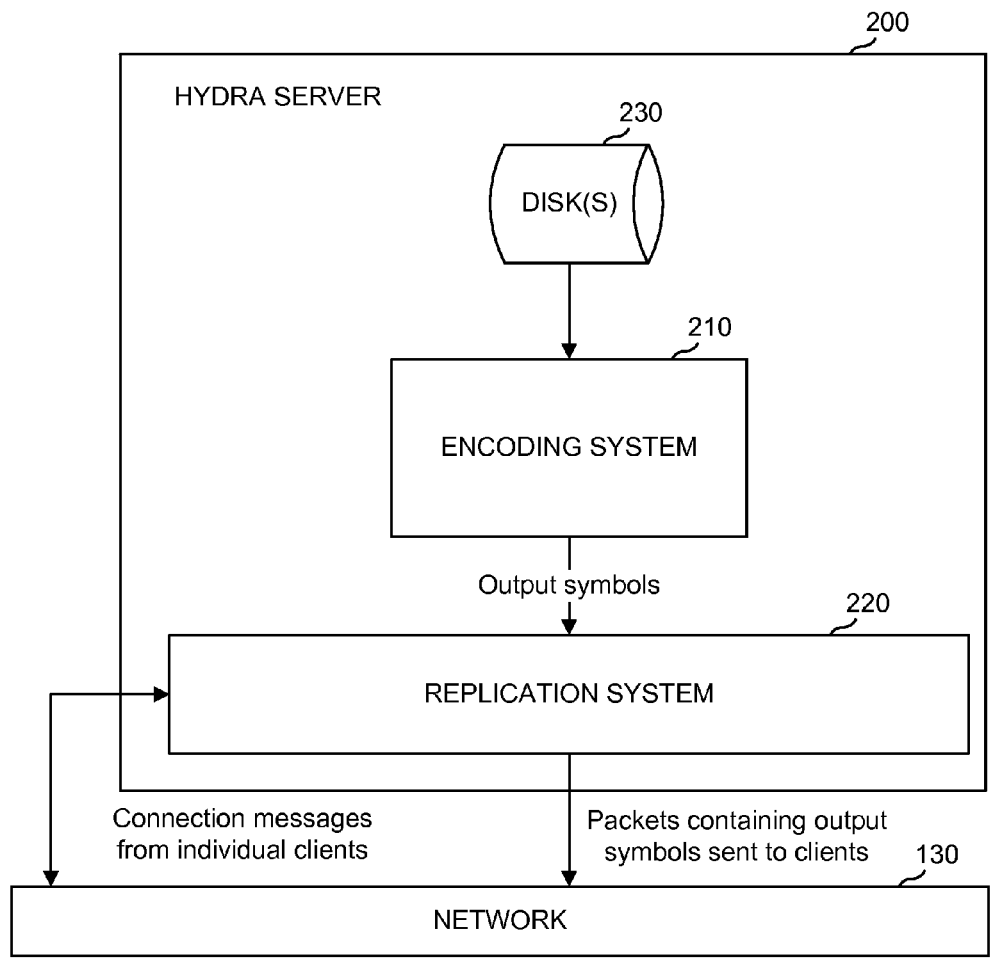
FIG. 3A is a block diagram of the two fundamental systems of a hydra server according to one embodiment of the present invention.

FIG. 3A is a simplified block diagram of a hydra server that delivers content in accordance with an embodiment of the present invention. This diagram is used herein for illustrative purposes only and is not intended to limit the scope of the invention. In this embodiment, the hydra server 200 comprises an encoding system 210, a replication system 220, and a disk (or other storage device) 230 that stores the content to be delivered. The encoding system 210 generates output symbols from the content stored on disk 230. The "Multiple Files Application" describes efficient techniques for doing so that may be used in certain embodiments of the present invention, as well as being described below in reference to FIG. 17. However, it is to be understood that many other techniques for generating output symbols from the content stored on disk 230 may be used as well.

In the presently described embodiment, the replication system 220 handles connection control messages received from individual requesting hydra clients via a network 130. Additionally, the replication system 220 receives output symbols generated by the encoding system 210 and transmits these to hydra clients through the network 130. A feature of this embodiment is that all hydra clients concurrently receiving the same content from the hydra server 200 will all receive copies of output symbols selected from a same pool of available output symbols generated by the encoding system 210. This is true even if hydra clients have started their reception of the content at completely different points in time. Thus, the output symbols that each hydra client receives are not specific to that client, but instead are drawn from the same pool of output symbols independent of when that hydra client reception started. This is unlike a traditional TCP/IP-based web server or streaming server 100 1, or a UDP-based traditional streaming server.

In the currently described embodiment, reliability is achieved by sending output symbols instead of just the original input symbols. Thus, each hydra client should be equipped with an appropriate decoder for regenerating the content from the received output symbols. Additionally, a hydra client should receive enough distinct output symbols so that the decoder may regenerate the content. Thus, if the pool of output symbols generated by the encoding system 210 is diverse enough such that it is unlikely that hydra clients will receive many duplicate output symbols, then the replication system 220 need not keep track of exactly which output symbols have been sent to each individual hydra client. In certain embodiments, chain reaction codes may be used by the encoding system 210 to generate output symbols. The description and properties of chain reaction codes are in "Luby I", "Luby II", "Windowing Application" and "Heavy Weight Application". When the encoding system 210 uses chain reaction codes for generating the output symbols there are very rarely duplicate output symbols, as each output symbol is generated randomly from an enormous pool of potential output symbols.

Thus, one function of the encoding system 210 is to achieve reliability. The replication system 220 helps in achieving reliability in that it helps ensure that each hydra client receives enough packets. But, unlike TCP/IP, the replication system 220 does not have to ensure that hydra clients receive a set of packets containing particular data. When the encoding system 210 does not use chain reaction codes but instead uses traditional forward error correcting (FEC) codes, or the like, more care must be taken in the overall design to ensure that the replication system 220 does not deliver many duplicate output symbols to hydra clients in order to ensure reliability.

In the currently described embodiment, the replication system 220 replicates output symbols from the available pool and sends the output symbols to each connected hydra client at an appropriate rate. Additionally, the replication system 220 maintains connections with each of the connected hydra clients. Connections with the hydra clients are maintained, and output symbols are transmitted to the hydra clients, via the network 130.

In some embodiments, output symbols may be generated and sent to each hydra client at a fixed rate by the hydra server 200. In this case, the encoding system 210 generates output symbols at a fixed rate and sends them to the replication system 220 via a logical channel, or the like. The replication system 220 may simply ensures that all output symbols that arrive in the logical channel are replicated and sent via the network 130 to the appropriate hydra clients.

In other embodiments, flow/congestion control may be used to send output symbols to each hydra client at an individual rate that may vary over time due to changing network conditions between the hydra server 200 and the hydra client. The replication system 220 may be used in implementing such flow/congestion control. For example, when a connected hydra client experiences packet loss, it may be desirable to slow down the transmission rate of packets to that hydra client, and when a connected hydra client experiences no packet loss over time, it may be desirable to increase the transmission rate of packets to that hydra client. The replication system 220 might receive indications from connected hydra clients of whether the rate should be increased, decreased, or maintained at the same rate. Several techniques for implementing such a flow/congestion control will be subsequently described.

Also, with embodiments in which multicast connected hydra clients are supported, then these hydra clients may join and leave multicast groups to adjust their reception rate, for example, as described in "Dynamic Layering Application". In such embodiments, the replication system 220 need not be involved with flow/congestion control with the multicast connected hydra clients. The encoding system 210 may help achieve flow/congestion control by ensuring that the pool of available output symbols for each content being served is being generated at a fast enough rate such that the replication system 220 can send, via the network 130, different output symbols from the pool at the rate of the fastest connected hydra client for that piece of content.

Similarly, with embodiments in which on-demand streaming is to be supported, the replication system 220 may be involved. On-demand streaming may be useful when, for example, a connected hydra client wants to regenerate the content in segments from the beginning to the end so that it can stream out the content without interruption at the hydra client. In certain embodiments, hydra clients may occasionally indicate to the replication system 220 of which segments of the content—the hydra client should receive output symbols, and several techniques for implementing this will be subsequently described.

If multicast connected hydra clients are also to be supported, then, in these embodiments, the multicast connected hydra clients may adjust from which segments they will receive output symbols by joining and leaving multicast groups as described in the "Media On-Demand Application". It is to be understood, however, that techniques other than those described in the "Media On-Demand Application" may also be used. The encoding system 210 may help achieve streaming by ensuring that the pool of available output symbols for each segment of content being served is being generated at a fast enough rate such that the replication system 220 can send different output symbols from the pool at the rate of the fastest connected hydra client for each segment of the content through a network 130.

In the embodiments described with respect to FIG. 3A, the hydra server 200 cleanly separates the tasks of preparing which data to send and when and where to send it in a scalable way. The encoding system 210 generates the output symbols for content that is to be sent to all hydra clients concurrently receiving the content. Thus, the resources the encoding system 210 uses to prepare the output symbols is amortized over all hydra clients that are concurrently receiving the content. Furthermore, the resource requirements for the encoding system 210 do not depend on the number of concurrent hydra client receptions in progress for the content. Thus, the encoding system 210 portion of the hydra server 200 is massively scalable to potentially an unlimited number of hydra clients. The resources used by the encoding system 210 to generate output symbols include disk resources, memory resources, and CPU resources.

Stand-Alone Hydra Server and Hydra Client

Figure 3B:
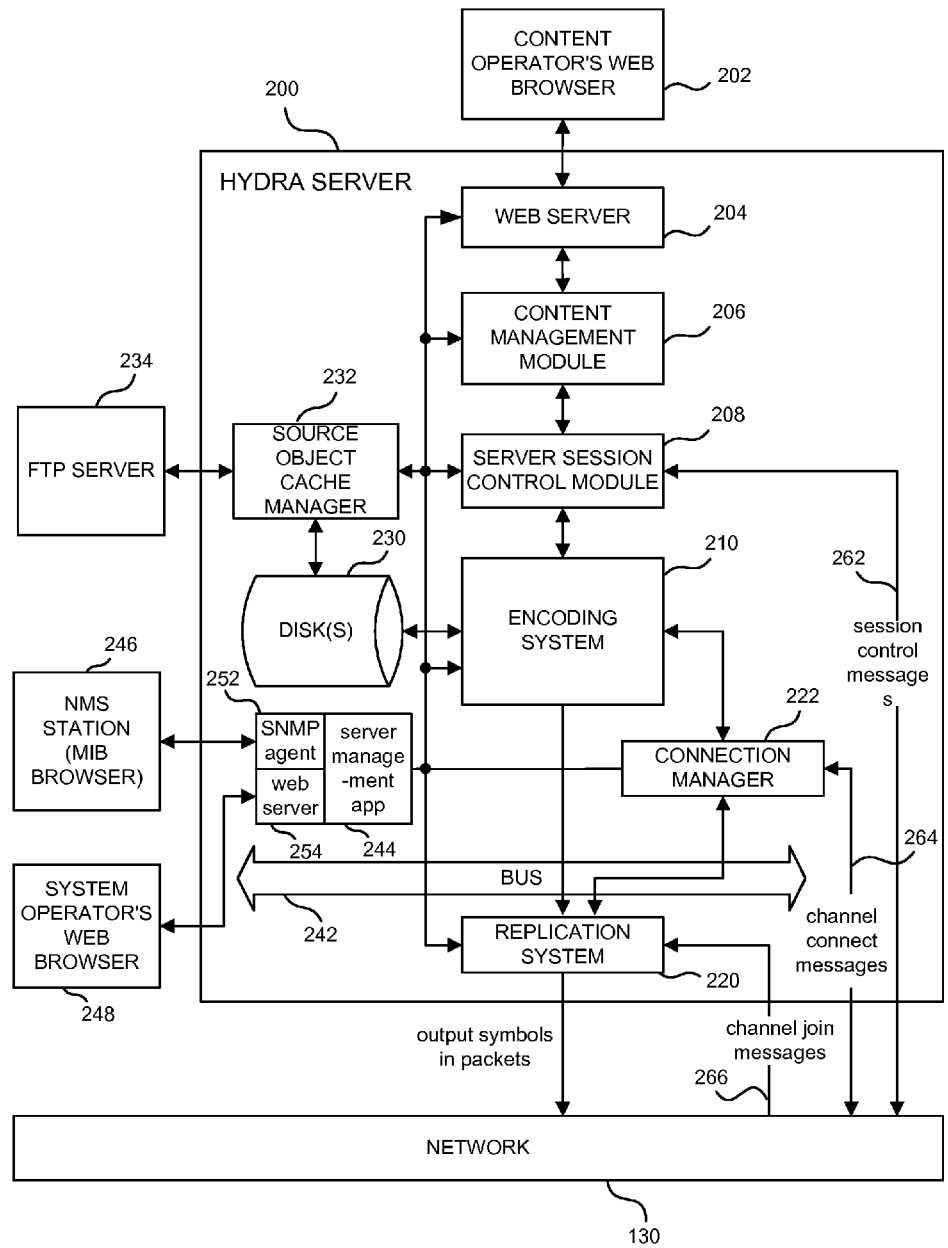
FIG. 3B is a block diagram of a stand-alone hydra server according to one embodiment of the present invention.
Figure 4:
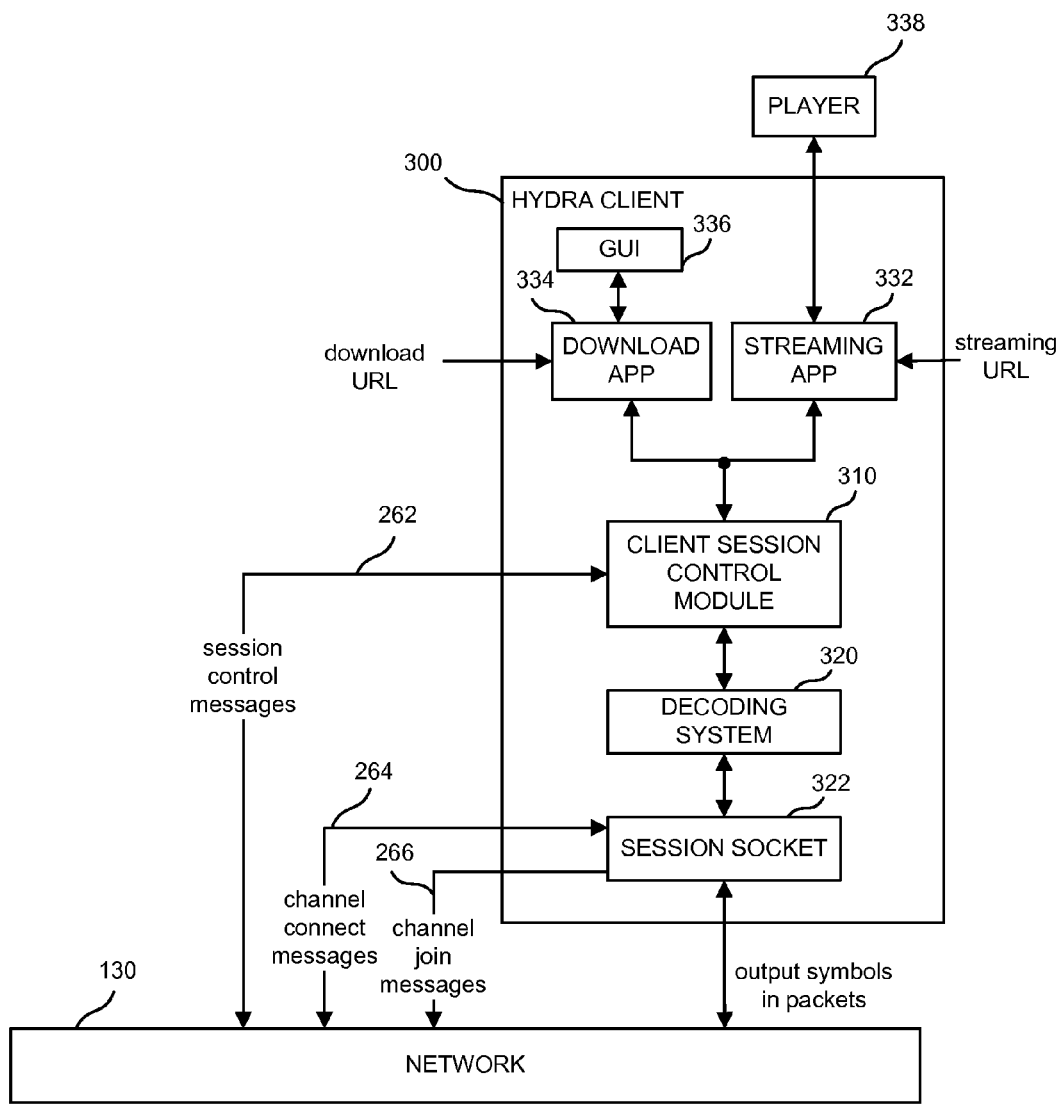
FIG. 4 is a block diagram of a stand-alone hydra client according to one embodiment of the present invention.

FIG. 3B is a simplified block diagram of another embodiment of a hydra server, and FIG. 4 is a simplified block diagram of a hydra client that receives content in accordance with an embodiment of the present invention. These diagrams are used herein for illustrative purposes only and are not intended to limit the scope of the invention. In these embodiments, the hydra server 200 and the hydra client 300 are stand-alone applications that interact with other applications through standard protocols.

In the embodiment illustrated in FIG. 3B, a system operator may install and configure the hydra server 200 on their network and registers its IP address with a domain name service (DNS). As shown in FIG. 3B, the system operator can setup and control the hydra server 200 through, for example, a management information base (MIB) browser 246, a system operator's web browser 248, etc., that communicates with, for example, a simple network management protocol (SNMP) agent 252, a web server 254, etc., coupled with a server management application 244 on the hydra server 200. This setup information may be made available by the server management application 244 to the web server 204, the content management module 206, the server session control module 208, the encoding system 210, the connection manager 222 and the replication system 220 for their use.

In this embodiment, a content operator can control and view what content is available on the hydra server 200 via a web browser 202 of the content operator and a web server 204 on the hydra server. In this embodiment, content may be moved to the hydra server 200 using a standard FTP server 234, or the like, onto storage device 230 of the hydra server 200, managed by the source object cache manager 232 which in turn is controlled by the server session control module 208, which in turn is controlled by the content management module 206, which is ultimately controlled by the content operator through the content operator's web browser 202.

In this embodiment, a content operator can setup the parameters for serving content through the content operator's web browser 202 once the content has been moved onto storage device 230 on the hydra server 200. The content management module 206 may make a URL available to the content operator. The content operator may instruct the hydra server 200 to start serving the content. This instruction passes through the content management module 206 through the server session control module 208 to the encoding system 210, which then starts generating output symbols for the content according to the setup parameters.

Hydra clients that want to join a session to receive output symbols for a particular content establish a session connection using session control messages 262.

As shown in FIG. 3B the encoding system 210 generates output symbols for content that is being served and sends these output symbols in UDP multicast packets to the replication system 220 over the bus 242. The multicast packets may be sent over the bus 242 directly through the network 130 without any processing within the replication system 220. Hydra clients that have a fully enabled multicast network connection to the hydra server 200 may use standard multicast protocols to join to and receive these multicast packets.

Referring now to FIGS. 3B and 4, in some embodiments, packets may be processed by the replication system 220 and served to hydra clients via multicast channels as follows. When a hydra client 300 registers interest in a particular multicast channel by contacting the connection manager 222 using channel connect messages 264, the connection manager 222 adds the hydra client to a list that is maintained for the channel. For a hydra client to remain as an active client in the channel list, the hydra client sends channel join messages 266 to the replication system 220. Whenever a packet is received from the encoding system 210 over the bus 242 by the replication system 220 for a particular channel, the replication system 220 makes a copy of the packet for each active client in the channel list. To do this, the replication system 220 puts the IP address of the hydra client machine as the destination address of the copied packet, puts in the correct port number, changes the checksum and potentially some other portion of the original packet header, and then copies the payload of the original packet and sends the copied packet through the network 130.

In one embodiment, the content operator can embed the URL made available by the content management module 206 in a web page to make it available to their end-users. In this embodiment, the URL may be a download URL, a streaming URL, etc. When an end-user clicks on this link in their web-browser, the URL will be fed into the hydra client 300 through the appropriate application, i.e., either the download application 334 or the streaming application 332, as shown in FIG. 4. The client session control module 310 can initiate a download or streaming session by using information in the URL to establish session control and obtain additional session information from the server session control module 208. The client session control module 310 passes session control information to the decoding system 320 which may establish channel connects and/or channel joins with the hydra server 200. Particularly, decoding system 320 may exchange channel connect messages 264 and channel join messages 266 with connection manager 222 and replication system 220, respectively, to commence receiving packets including output symbols corresponding to the desired channels.

If the session is a content download session, the decoding system 320 may continue to control the incoming flow of packets until enough output symbols are received to reconstruct the content, and the end-user may monitor this progress through information displayed to the GUI 336. Once enough output symbols have been received the decoding system 320 reconstructs the content and signals the client session control module 310, which in turn signals the download application 334 which in turn displays the appropriate messages in the GUI 336. The end-user may control what is done with the content, e.g., save or open, or save and open, through the GUI 336. The end-user may also control pausing and resuming the reception of packets through the GUI 336. In one embodiment, output symbols for content are sent to one or more channels, and the decoding system 320 may control to which channels are joined at each point in time to control the reception rate of the content, for example as described in "Dynamic Layering Application".

If the session is a content streaming session, the decoding system 320 may continue to control the incoming flow of packets. If the content is partitioned into sections, as for example described in the "Media on Demand Application", the decoding system 320 may reconstruct each section of the content as enough output symbols are received for the section. In this embodiment, output symbols for each section are sent to a separate channel, and the decoding system 320 may control to which channels are joined at each point in time to control the timing of section reconstruction. As a section is reconstructed, the decoding system 320 may signal the client session control module 310, which may, in turn, signal the streaming application 332 that the section is reconstructed. The streaming application 332 may control sending the reconstructed sections to the player 338.

Hydra Server and Hydra Client Coupled with Other Applications

Figure 5:
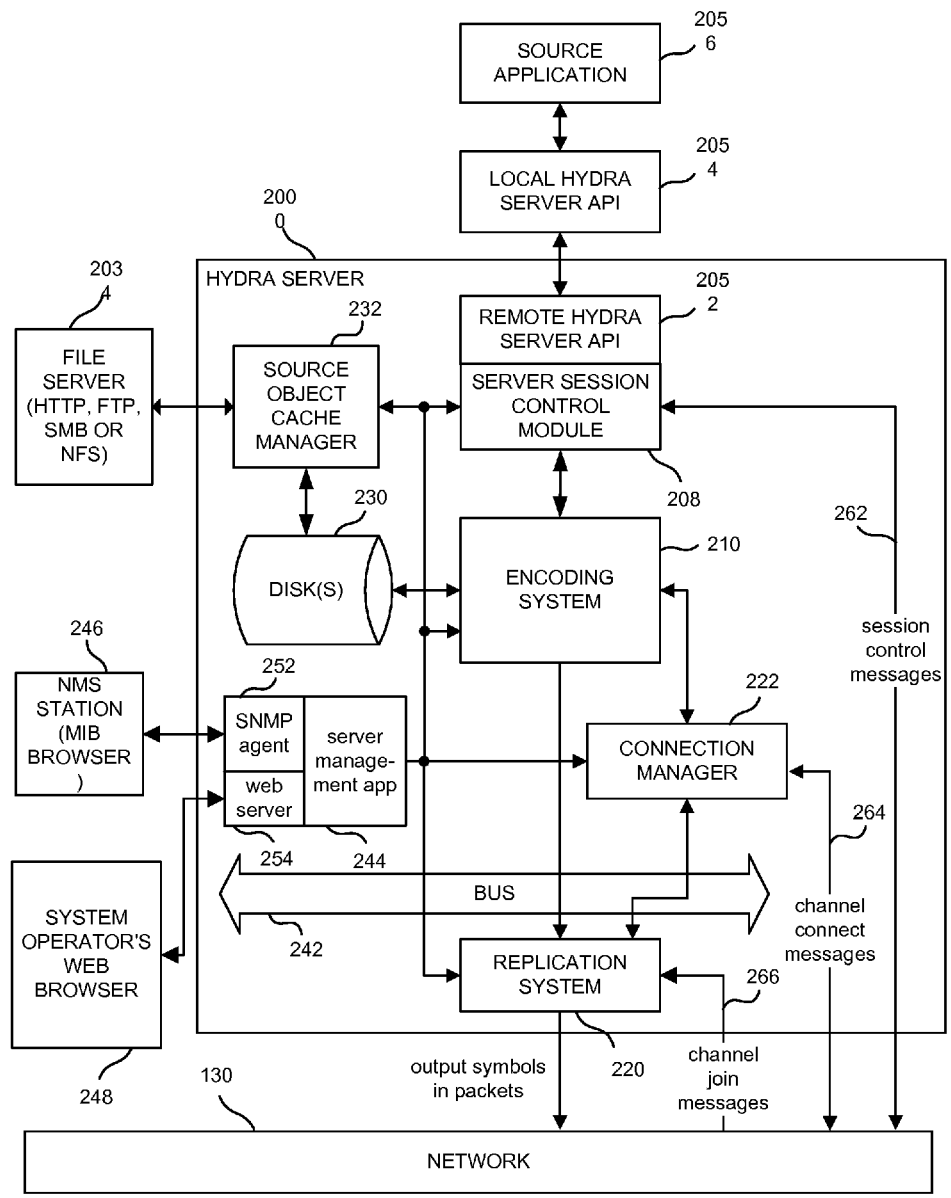
FIG. 5 is a block diagram of a hydra server coupled with a source application according to one embodiment of the present invention.
Figure 6:
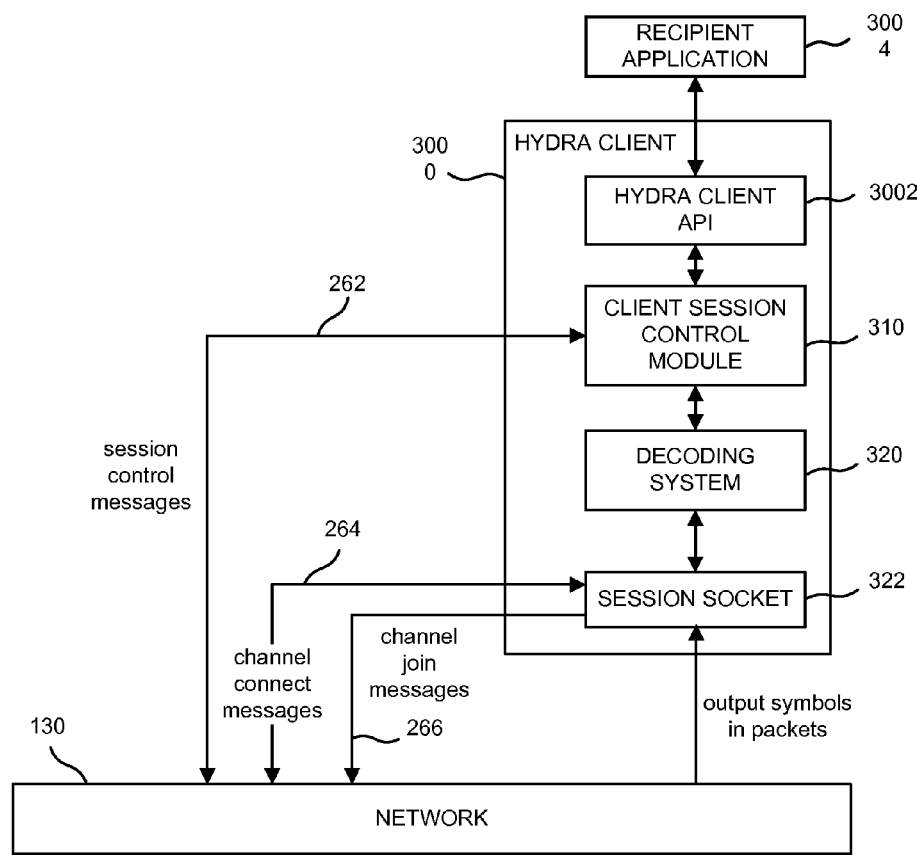
FIG. 6 is a block diagram of a hydra client coupled with a recipient application according to one embodiment of the present invention.

FIGS. 5 and 6 are simplified block diagrams of yet another embodiment of a hydra server, and another embodiment of a hydra client, respectively. These diagrams are used herein for illustrative purposes only and are not intended to limit the scope of the invention. In these embodiments, the hydra server 2000 is coupled with a source application 2056 and the hydra client 3000 is coupled with a recipient application 3004.

Referring to FIG. 5, in this embodiment, a system operator may install and configure the hydra server 2000 on their network and registers its IP address with DNS. The system operator may setup and control the hydra server 2000 through a MIB browser 246, a system operator's web browser 248, etc., that communicates with an SNMP agent 252, a web server 254, etc., coupled to a server management application 244 on the hydra server 2000. This setup information may be made available by the server management application 244 to the server session control module 208, the encoding system 210, the connection manager 222 and the replication system 220 for their use.

In this embodiment, a source application 2056 may control the content that the hydra server 2000 serves through the local hydra server application programming interface (API) 2054 that typically (but not necessarily) resides on the same machine that the source application is running on. The local hydra server API 2054 connects with the remote hydra server API 2052. In this embodiment, content may be moved to the hydra server 2000 using a standard file server 2034, or the like, onto storage device 230 on the hydra server 2000, managed by the source object cache manager 232 which in turn in controlled by the server session control module 208, which in turn is controlled by the source application 2056 through the local hydra server API 2054 and the remote hydra server API 2052.

In this embodiment, a source application 2056 may setup the parameters for serving content by sending commands through the APIs to the server session control module 208. The server session control module 208 may return information about the session to the source application 2056 through the APIs. The source application 2056 may instruct the hydra server 2000 to start generating and sending output symbols for the content. This instruction may pass through the server session control module 208 to the encoding system 210, which then starts generating output symbols for the content according to the setup parameters.

Hydra clients that want to join a session to receive output symbols for a particular content establish a session connection using session control messages 262.

In this embodiment, the encoding system 210 generates output symbols for content that is being served and sends these output symbols in UDP multicast packets via the bus 242 to the replication system. The packets may be sent directly through the replication system 220 and through the network 130 without any processing within the replication system 220. Hydra clients that have a fully enabled multicast network connection to the hydra server 2000 may use standard multicast protocols to join to and receive these multicast packets.

Referring now to FIGS. 5 and 6, the packets may also processed by the replication system 220 as follows. When a hydra client 3000 registers interest in a particular multicast channel by contacting the connection manager 222 using channel connect messages 264, the connection manager 222 adds the hydra client to a list that is maintained for the channel. For a hydra client 3000 to remain as an active client in the channel list, the hydra client 3000 sends channel join messages 266 to the replication system 220. Whenever a packet is received from the encoding system 210 over the bus 242 by the replication system 220 for a particular channel, the replication system 220 makes a copy of the packet for each active client in the channel list. To do this, the replication system 220 puts the IP address of the hydra client machine as the destination address of the copied packet, puts in the correct port number, changes the checksum and potentially some other portion of the original packet header, and then copies the payload of the original packet and sends the copied packet through the network 130.

The relevant session information is passed out of band from the source application 2056 to a recipient application 3004. As shown in FIG. 6 this information is passed into the hydra client 3000 to the client session control module 310 through the hydra client API 3002. The client session control module 310 uses this information to establish session control and obtain additional session information from the server session control module 208 within the hydra server 2000 using session control messages 262 to commence the session to receive packets containing output symbols for the content. The client session control module 310 passes session control information to the decoding system 320 and the decoding system 320 establishes channel connect using the channel connect messages 264 and channel join using the channel join messages 266 for the appropriate channels with the connection manager 222 and replication system 220 within the hydra server 2000, respectively, to commence receiving packets containing output symbols generated from the content in the channels specified in the channel connects and channel joins.

If the session is a content download session, the decoding system 320 continues to control the incoming flow of packets until enough output symbols are received to reconstruct the content, and the recipient application 3004 monitors this progress through information passed up through the hydra client API 3002. Once enough output symbols have been received the decoding system 320 reconstructs the content and signals the client session control module 310, which in turn signals the recipient application 3004 through the hydra client API 3002. The recipient application 3004 controls what is done with the content once it has been passed off.

If the session is a content streaming session, the decoding system 310 may continue to control the incoming flow of packets. As enough output symbols are received for each section of the content, the section is reconstructed by the decoding system 310. Additionally, the decoding system 310 may signal the client session control module 310 that a section has been decoded, and the control module 310 may in turn signal the recipient application 3004 through the hydra client API 3002. The recipient application 3004 may control what is done with reconstructed sections.

Requesting Hydra Clients

A hydra client requesting content from the hydra server is any machine or process that is not part of the hydra server and that is authorized to request output symbols from a particular logical channel or set of logical channels. For example, a requesting hydra client may be a machine that requests output symbols from a logical channel that are to be sent to the IP address of the machine and where UDP packets are used to carry output symbols to the hydra client. As another example, a hydra client may be a machine where the hydra client requests output symbols from a logical channel to be sent to the IP address of the machine and where TCP packets are used to carry output symbols to the hydra client. As yet another example, a hydra client may be a machine that requests output symbols from a logical channel by subscribing to an IP multicast group address that corresponds to the channel. In this example, output symbols may be included in UDP multicast packets sent to the multicast group.

Placing Output Symbols into Packets

In some embodiments, the encoding system assembles output symbols into packets before placing them into the pool and making them available to the replication system. The reason for doing this is to do as much work as possible that is common to all hydra clients in the encoding system, and to perform only the minimal individualization of packets necessary within the replication system for each connected hydra client. Thus, the packet format that the encoding system places the output symbols into is as similar as possible to the final format of the packets that are to be sent to each individual connected hydra client. The replication system basically sends the same packet as received from the encoding system to all connected hydra clients, and only small portions of the packet need to be changed when it is replicated and sent to a connected hydra client, e.g., the destination address of the hydra client, the port number, the checksum, etc. Thus, the computational resources needed for replicating a packet that is being sent to a connected hydra client is minimal, and much of the copying can be done in hardware and/or by micro-engines with limited functionality that can work at tremendous speeds. This allows the replication system to support orders of magnitude more connected hydra clients than a traditional web or streaming server can support using TCP senders.

It is to be understood that the assembly of output symbols into packets need not be performed in the encoding system. For example, such assembly could be performed in a packet assembly system separate from the encoder. Additionally, in embodiments including a multicast packet path and a replication system, packet assembly for multicast packets could be performed by a multicast packet assembly system, and packet assembly for non-multicast packets in a non-multicast packet assembly system. One skilled in the art will recognize many other equivalents, variations, and alternatives.

A replication system may also be used without an encoding system that generates packet payload. For example, instead of using an encoding system, the original content may be streamed to the replication system, and then the replication system copies and sends all data to all connected hydra clients, e.g., using UDP unicast packets. However, such a server would not be able to support downloads or on-demand streaming effectively, and for live streaming any packet loss would lead to unpredictable degradation of play out quality by hydra clients.

Using Multiple Channels Per Content

As described in "Dynamic Layering Application" and "Media On-Demand Application", sending packets to multiple logical channels for each content being served can be beneficial for allowing hydra clients to attach to different subsets of the channels to control the rate at which packets are received for flow/congestion control and to control which portions of the content the received packets contain information about for streaming applications. Using multiple logical channels per content can be useful for many other reasons as well, including applications where different blocks of a live stream are sent to different logical channels.

Figure 7:
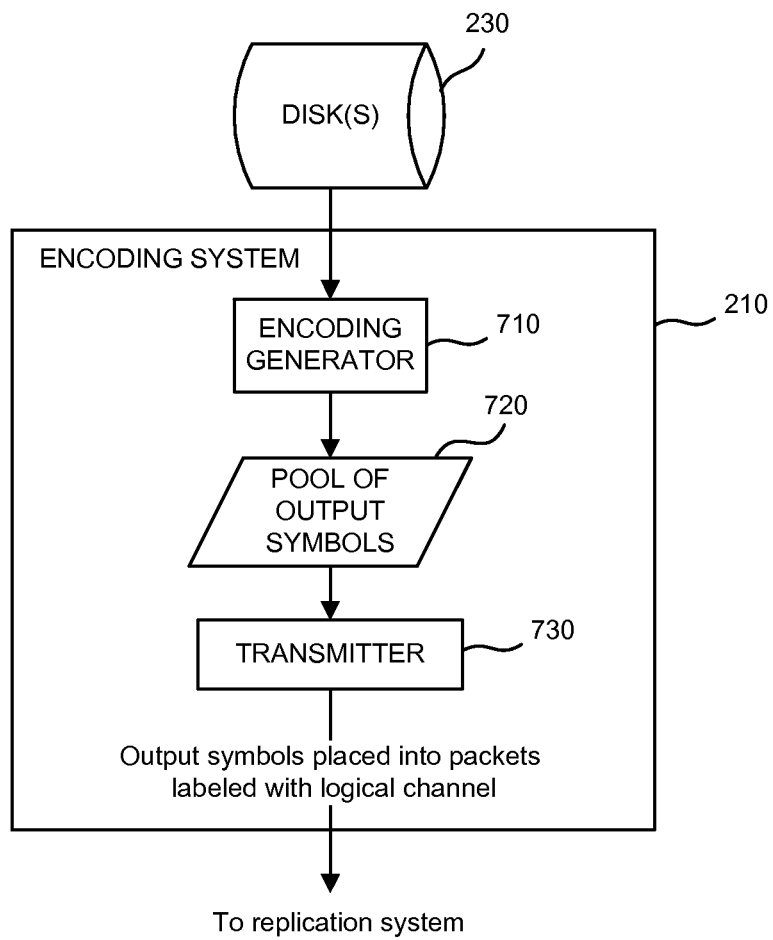
FIG. 7 is a block diagram of an encoding system according to one embodiment of the present invention.

In a hydra server, the task of placing packets into different logical channels is the role of the encoding system, since this is a task that is not particular to each connected hydra client. In this case, as shown in FIG. 7 and as described in more detail in "Multiple Files Application", the encoding system 210 can be further partitioned into two parts: the encoding generator 710 that generates all of the output symbols and stores them in a pool of output symbols 720 for all the content being served either stored on disk 230 or other storage, and the transmitter 730 which takes output symbols from the pool of output symbols 720 and places them into packets with the appropriate logical channel label and makes the packets available at the proper rate for the replication system.

Bypassing the Replication System

It is possible that the packets generated by the encoding system, in addition to being sent to the replication system, are also sent directly out onto the network without modification, thereby effectively bypassing the replication system. This is useful when there are hydra clients that can receive the packets without having to request the content directly from the replication system. One possible packet format that the encoding system can use for this is a multicast packet format. In this case multicast connected hydra clients can join the appropriate multicast group or channel using Internet Gateway Message Protocol (IGMP) control messages and receive these packets directly, thereby bypassing the logic of the replication system. Other possible packet formats may also be used, for example MPEG-2, and it is also possible that hydra clients may be configured to receive such packets over the network without having to request the packets directly from the replication system, e.g., if the packets are sent over a broadcast network such as some satellite transmission networks.

In embodiments in which the encoding system uses the multicast packet format, possible ways of labeling packets for a particular logical channel include using the multicast group address, or the channel pair of the multicast source address and the multicast group address. By so labeling the packets, multicast connected hydra clients can directly start and stop receiving packets from different logical channels by sending IGMP join and leave control messages into the network, and the multicast network may ensure that these packets are delivered to the hydra clients that are joined and that delivery stops to the hydra clients that have left. In this embodiment, the hydra server need not handle such join and leave messages from the multicast hydra clients.

It is possible that some hydra clients may be able to receive packets that are sent directly to the network from the encoding system while other hydra clients may only be able to receive packets from the replication system upon requests. Since each requesting hydra client receives copies of packets that are sent to that individual hydra client, there may be substantial bandwidth savings out of a hydra server to have as many hydra clients as possible receive packets that are sent directly to the network from the encoding system. An example of such a situation is when the encoding system generates and sends multicast packets. In this case, all hydra clients can be configured to first try receiving packets via UDP multicast and if this fails then try UDP unicast. Thus, such a hydra client may know through some other means whether or not it can receive multicast packets from the hydra server. If the hydra client can, then it joins and leaves multicast channels to receive content from the server. If the hydra client cannot, then it requests the content directly from the connection manager within the replication system of the hydra server and receives UDP packets sent individually to that hydra client. Alternatively, the hydra client may not know through other means whether or not it can receive multicast packets from the hydra server. In this case, the hydra client may be automatically configured to first try joining and receiving multicast packets. If the hydra client fails to receive multicast packets after a short amount of time then it automatically makes requests to the connection manager in the replication system to receive UDP packets sent directly to that hydra client.

In some implementations, it is more efficient for the encoding system to send two copies of each packet, one to the replication system that will be replicated to requesting hydra clients, and the other directly to the network for hydra clients that can receive packets directly from the network without going through the replication system. In these implementations the format of the two copies of the packet can be different. One possible advantage of this is that the packet format for the packet sent to the replication system may be optimized so as to minimize the amount of processing the replication engine does for each packet replicated to a requesting hydra client, and this packet format may be different than the packet format that can be received by a hydra client directly from the network. For example, one copy of the packet may be sent to the replication system in a TCP format, while the other copy may be sent to the network in a UDP multicast format. In these implementations the channel to which the two copies are sent can be different. One possible advantage of this is that a requesting hydra client using the replication system may be using a different flow/congestion control protocol than a hydra client that can receive packets directly from the network. For example, requesting hydra clients may be using "static layering" whereas hydra clients receiving packets directly from the network may be using "dynamic layering" (static layering and dynamic layering are described in detail in "Dynamic Layering Application"). As another example, requesting hydra clients may be using TCP flow/congestion control whereas hydra clients receiving packets directly from the network may be using dynamic layering.

A Simple Replication System

Figure 8:
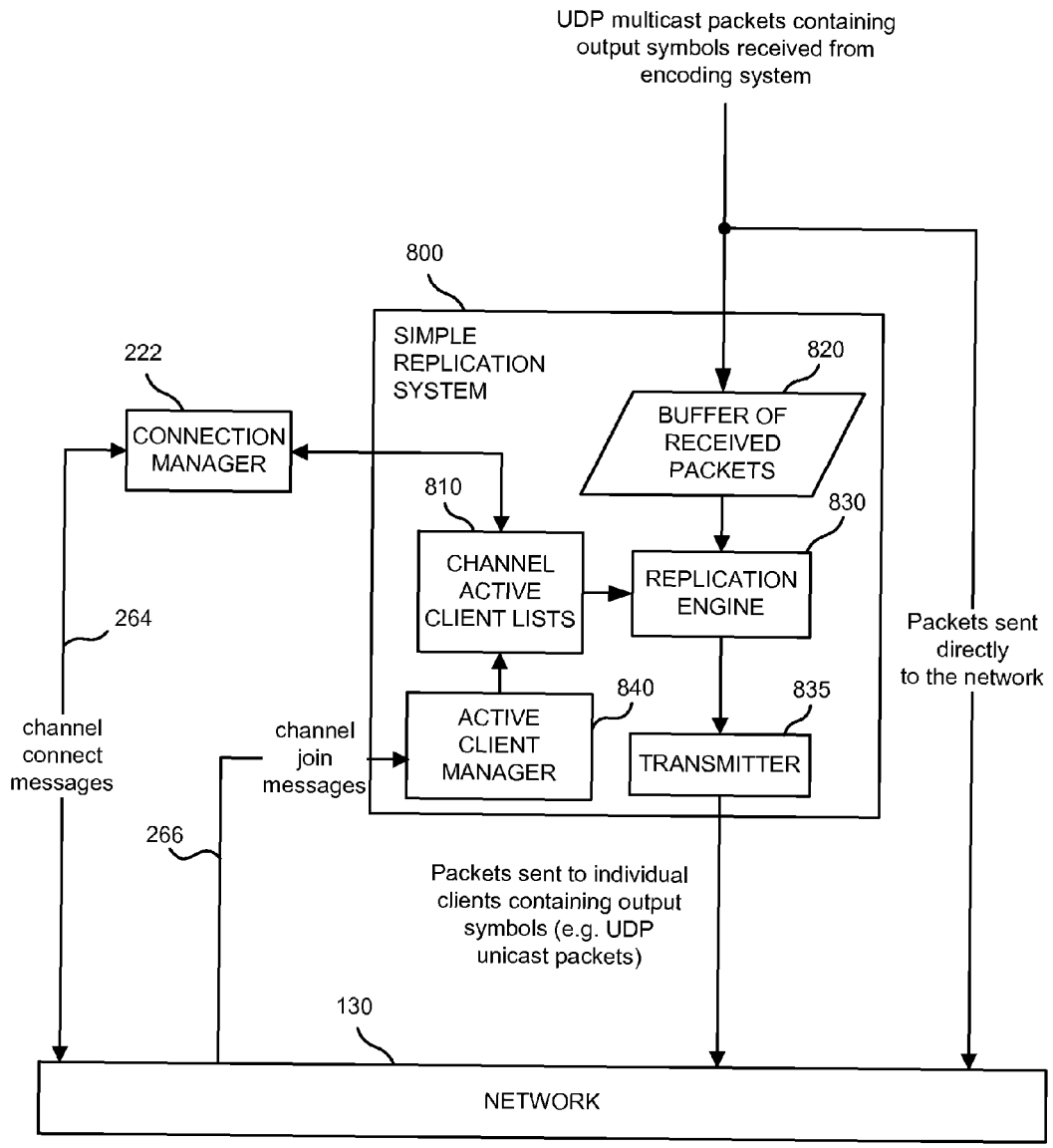
FIG. 8 is a block diagram of a simple replication system according to one embodiment of the present invention.

FIG. 8 is a simplified block diagram of an embodiment of a replication system. This diagram is used herein for illustrative purposes only and is not intended to limit the scope of the invention. A connection manager 222 handles channel connect messages 264 from hydra client. Hydra clients may use channel connect messages to connect and disconnect from channels. The connection manager 222, which is not part of the replication system 800 in this embodiment, is responsible for managing and maintaining channel active client lists 810. In this embodiment, the connection manager 222 maintains a channel active client list for each channel. An active client manager 840 within the replication system 800 is responsible for accepting and processing channel join messages 266 received from the hydra clients. In this embodiment, repeated channel join messages from a hydra client maintains the hydra client as active for the one or more channels. Particularly, the hydra client repeatedly sends a channel join message to remain on a channel active client list 810. Details of one particular method for implementing this are described later.

In the embodiment shown in FIG. 8, the connection manager 222 maintains a channel active client list for each logical channel. The channel active client list for a particular channel is a list of all the requesting hydra clients that will be sent a copy of each packet received in that logical channel from the encoding system. The active client manager 840 updates each list repeatedly based on channel joins received from the individual requesting hydra clients. For each hydra client in each list, the active client manager 840 maintains whatever information is particular to that hydra client and that needs to be changed in a replicated packet before it can be sent to the hydra client, e.g., the destination IP address of the hydra client, the destination port address, etc.

Each packet that arrives to the replication system 800 from the encoding system may be stored in a buffer of received packets 820. A replication engine 830 processes each packet in the buffer 820. For each packet in the buffer 820, the replication engine 830 determines the logical channel of the packet, accesses the corresponding channel active client list 810, and then for each hydra client in the list makes a copy of the packet. Additionally, the replication engine 830 changes and/or adds portions of the packet that are particular to the hydra client, e.g., the destination address of the hydra client, the destination port address, the checksum, etc. Then, the replicated packet is transmitted by a transmitter 835 to the hydra client via the network.

When hydra clients are able to receive packets from logical channels that are sent directly to the network from the encoding system, similar logic for joining and leaving logical channels may be used for a hydra client receiving the packets directly from the encoding system as is used by a requesting hydra client receiving packets from the replication system. With the replication system 800, this is possible when, for example, the encoding system generates multicast packets. In this specific embodiment, the reception behavior and experience of hydra clients can be made to be similar independent of whether they are receiving multicast packets sent directly from the encoding system or whether they are receiving unicast packets requested from and replicated by the replication system. Thus, the hydra client experience may appear similar independent of whether the network that connects them to the hydra server is fully multicast enabled.

FIG. 8 depicts some multicast packets being diverted around the replication system 800, and the above description refers to such packets as being sent directly to the network from the encoding system. However, it is to be understood that in other embodiments, such packets may also be sent through the replication system 800. For example, the replication system 800 could receive such packets and forward them to the network unchanged.

Multiple Channel Hydra Server

The strategy of using multiple channels per content combined with a simple replication system can be used for a variety of applications.

For example, for a download application, output symbols for content may be generated and sent to the simple replication system 800 in packets and in multiple channels. Additionally, the rate of each channel may be different. Then, hydra clients can join and leave channels to perform flow/congestion control, for example using the methods described in "Dynamic Layering Application". In this example, the simple replication system 800 may keep track of which channels each hydra client is interested in receiving at particular periods of time. Further, the replication system 800 replicates the packets it receives from the encoding system and that correspond to those channels and sends them to the hydra client.

The simple replication system 800 may also be used in on-demand streaming applications. In some embodiments, content to be streamed is partitioned into segments. In these embodiments, the encoding system may, for example, send packets of output symbols corresponding to a segment in a same channel. Additionally, each segment may correspond to a different channel. Then, hydra clients can join and leave channels to receive packets corresponding to the different segments. For example, hydra clients may start with the first segments and progress through the segments in order. The "Media On-Demand Application" explains this technique and other similar techniques in detail. In this example, the simple replication system 800 may keep track of which channels each hydra client is interested in receiving at particular periods of time. Further, the replication system 800 replicates the packets it receives from the encoding system and that correspond to those channels and sends them to the hydra client.

The simple replication system 800 may further be used in live streaming applications. In some embodiments, the content to be live-streamed is partitioned into blocks and the output symbols for the different blocks may be generated and sent to the simple replication system in packets. For example, output symbols corresponding to a block may be sent in packets to the simple replication system in a same channel. In a specific embodiment, each block may use a channel that is chosen from a small set of channels, and where channels are chosen in a rotating manner by the blocks. Then, for example, the hydra clients can join all of the small set of channels and receive all the output symbols for all the blocks. In another embodiment, the hydra clients can join and leave channels, for example, when they experience loss in order to optimize reception of enough output symbols to recover at least some blocks while potentially sacrificing partial or full recovery of other blocks. In this example, the simple replication system 800 may keep track of which channels each hydra client is interested in receiving at particular periods of time. Further, the replication system 800 replicates the packets it receives from the encoding system and that correspond to those channels and sends them to the hydra client.

It is to be understood that the above-described applications are merely examples of the many applications in which embodiments of the present invention may be used. One skilled in the art will recognize many other equivalents, variations, or alternatives.

Timed Joins

In some embodiments, a requesting hydra client may send channel join messages occasionally to the replication system to inform the replication system from which channels the requesting hydra client wants to be sent packets. In one specific embodiment, the requesting hydra client sends timed channel join messages to the replication system. A timed channel join message includes the channels from which the requesting hydra client wants to receive packets, together with a time value for each channel that indicates for what period of time the hydra client would like to receive packets from the channel. For each channel requested by the hydra client, the replication system keeps track of this time value, and when this amount of time has passed, the replication system automatically stops sending packets to the requesting hydra client. For example, if the requesting hydra client sends a join message for logical channel A with a time-out value of 5 seconds, then the replication system will send all packets received from the encoding system for channel A to the requesting hydra client for a period of 5 seconds after the replication system receives the join message.

One advantage of using timed joins is that if the requesting hydra client is for some reason disconnected from the replication system, either temporarily, for example, due to a flood of packets through the intervening network infrastructure, or on a longer term, for example, due to a malfunctioning intervening router, then the hydra server will automatically stop sending packets to the requesting hydra client once the time-out values have expired. Thus, it is not required that the requesting hydra client be able to send messages to the replication system reliably to stop the reception of packets.

In some embodiments, join messages for a particular channel may be sent repeatedly at a fast enough rate so that the hydra client continually receives packets from that channel for as long as desired. For example, the requesting hydra client may send a join message for channel A with a time-out value of 5 seconds each 4 seconds. In this example, as long as these join messages are received by the replication system without loss and with at most a delay of 1 second from the time the join is sent by the requesting hydra client until the time it is received by the replication system then the requesting hydra client will continually receive all packets from channel A. As another example, the requesting hydra client sends a join message for channel A with a time-out value of 5 seconds each 2 seconds. In this example, if at least one of each two consecutive join messages is received by the replication system with a delay of at most 1 second from the time the join is sent by the requesting hydra client until the time it is received by the replication system then the requesting hydra client will continually receive all packets from channel A.

In some embodiments, the time-out value for each channel may be specified and vary in each join message. In other embodiments, the time-out value for each channel may be specified once at the beginning of the reception and the requesting hydra client does not specify the time-out value in the join message. In still other embodiments, a default time-out value may be specified at the beginning of the reception, and the hydra client may specify a different time-out value in join messages. If a time-out value is not specified in a join message, then the time-out value is the default value. One skilled in the art will recognize many other equivalents, modifications, or alternatives.

In some embodiments, the join message may include joins for several channels with different corresponding time-out values. For example, channels A, B and C may be associated with a particular content. Then, the hydra client may send a join message for channels A, B and C with time-out values of 5 seconds, 3 seconds and 4 seconds, respectively. In some embodiments, the join messages sent by the requesting hydra client include the list of all channels from which the requesting hydra client is interested, at that point in time, in receiving packets. In specific embodiments, upon receipt of a join message from a requesting hydra client, the replication system stops sending packets to the requesting hydra client from all channels not specified in the join message. For example, if the replication system is currently sending packets from channel A for 3 more seconds and from channel B for 1 more second when the replication system receives a join message from the requesting hydra client that specifies a join to channel B for 3 seconds and a join to channel C for 4 seconds, then the replication system may stop forwarding to the requesting hydra client packets from channel A. And, the replication system will continue to send packets from channel B for 3 seconds to the requesting hydra client and the replication system will start to send packets from channel C for 4 seconds to the requesting hydra client. Similarly, these time-out values may subsequently be overridden by receipt of other join messages from the requesting hydra client.

In some embodiments, a requesting hydra client can send a channel join message to join any subset of the available channels. For example, the requesting hydra client may send a join message for channels A and C among the possible channels A, B and C. In other implementations the channels associated with content are logically ordered, for example the order is A, B and C, and a requesting hydra client can only send join messages to join a prefix of the channels, in this case a join message with no channels specified, a join message to channel A, a join message to channels A and B, or a join message to all three channels A, B and C. In this case, the time-out values for the channels may be specified at the beginning of the reception and they may be monotonically decreasing through the ordering of the channels, e.g., 5 seconds for channel A, 3 seconds for channel B and 1 second for channel C. A join message may only include the top channel of the prefix specified. For example, if the requesting hydra client wants to send a join message for channels A and B, then the message may include only an indication of channel B, rather than including an indication of both channel A and channel B. Receipt of this join message by the replication system automatically initiates or extends the sending of all packets from channel A to the requesting hydra client for the next 5 seconds and automatically initiates or extends the sending of all packets from channel B to the requesting hydra client for the next 3 seconds.

One specific embodiment that may be suitable for download applications is to use channels that are logically ordered and requesting hydra clients always receive packets from a prefix of these channels with respect to the ordering. One reason for doing this is to allow requesting hydra clients to enact flow/congestion control protocols by joining and leaving subsets of channels. Examples of such methods are described in "Dynamic Layering Application". In these examples, the channels are logically ordered and a requesting hydra client may send join messages for a prefix of the channels with respect to the ordering. It is to be understood, however, that the techniques described in the Dynamic Layering Application are merely examples of specific techniques that may be used in various embodiments of the present invention. One skilled in the art will recognize many other equivalents, variations, and alternatives to those techniques.

In some embodiments, it is useful to set the time-out values so that they are monotonically decreasing with respect to the ordering of the channels. For example, when static layering congestion control as described in "Dynamic Layering Application" is used for a download application, packets are sent to each channel at a fixed rate with the property that the aggregate rate of all packets sent to a given prefix of the channels grows by a fixed factor as each channel is added to the prefix. For example, channel A may be carrying packets at 100 Kbps, channel B at 30 Kbps, channel C at 39 Kbps, channel D at 51 Kbps, etc. In this example, the aggregate rate of packets sent to each prefix is 1.3 times the rate of the previous prefix, e.g., the aggregate rate of prefix A, B, C, D is 220 Kbps, which is 1.3 times the aggregate rate of prefix A, B, C of 169 Kbps, which is 1.3 times the aggregate rate of prefix A, B of 130 Kbps, which is 1.3 times the aggregate rate of prefix A of 100 Kbps. The value of the time-out value for each channel partially determines how often a requesting hydra client needs to send join messages to the replication system to continue receiving packets from that channel. In the example, the requesting hydra client may send join messages to a given prefix of the channels at 2.5 times the frequency of the time-out value for the highest channel in the prefix. Thus, if the time-out value for channel A is 7.5 seconds, the time-out value for channel B is 6.25 seconds, the time-out value for channel C is 5 seconds, and the time-out value for channel D is 3.75 seconds, then the requesting hydra client would send join messages for prefix A each 3 seconds, for prefix A, B each 2.5 seconds, for prefix A, B, C each 2 seconds, and for prefix A, B, C, D each 1.5 seconds. Thus, the higher the reception rate of the requesting hydra client the more often join messages would be sent to the replication system to maintain that rate.

One reason for setting the time-out values to be monotonically decreasing is so that the aggregate rate of channel join messages sent from all requesting hydra clients to the replication system does not vary dramatically depending on the mix of reception rates of the requesting hydra clients. For example, suppose the replication system has capacity to send 2 Gbps of packets to all channels and the channels and their time-out values are as described in the previous paragraph. Then, if 9,090 requesting hydra clients are joined to prefix A, B, C, D then their aggregate reception rate is 2 Gbps and the rate of join messages to the replication system is 9,090/1.5 sec.=6,060 per second. If 11,834 requesting hydra clients are joined to prefix A, B, C then their aggregate reception rate is 2 Gbps and the rate of channel join messages to the replication system is 11,834/2 sec.=5,917 per second. If 15,384 requesting hydra clients are joined to prefix A, B then their aggregate reception rate is 2 Gbps and the rate of channel join messages to the replication system is 15,384/2.5 sec.=6,153 per second. If 20,000 requesting hydra clients are joined to prefix A then their aggregate reception rate is 2 Gbps and the rate of channel join messages to the replication system is 20,000/3 sec.=6, 666 per second. Any mix of different reception rates for the requesting hydra clients will result in a channel join message rate to the replication system somewhere between the minimum and maximum of these different channel join message rates, i.e., somewhere between 5,917 and 6,666 join messages per second. Thus, the rate of channel join messages to the replication system in this example is roughly the same independent of the mix of reception rates of the requesting hydra clients.

As another example, in an on-demand streaming application as described in "Media On-Demand Application", channels may be logically ordered and the hydra client may send channel join messages to request packets from a consecutive set of channels with respect to the ordering (not necessarily a prefix). In this example, each channel may correspond to a segment of the content to be streamed, and the time-out value may be proportional to the length of the segment. For example, a 10 minute MPEG-2 encoded video that is 320 MB in length may be partitioned into segments of length 10 MB, 20 MB, 30 MB, 50 MB, 80 MB and 130 MB. In a specific embodiment, a simple scheduling scheme may be employed where the requesting hydra client joins the first two channels, receives enough packets to recover the first segment, then leaves the first channel and joins the third channel until the requesting hydra client has received enough packets to recover the second segment, then leaves the second channel and joins the fourth channel until the requesting hydra client has received enough packets to recover the third segment, and so on. Then, the respective time-out values for the channels corresponding to the different sections may be, for example, 10 seconds, 20 seconds, 30 seconds, 50 seconds, 80 seconds and 130 seconds, respectively. In this example, the hydra client could specify in each channel join message the range of channels from which it is interested in receiving packets, and the replication system could stop sending packets from any channel not specified in the channel join message upon receipt of the message.

As yet another example, a live streaming application may use a fixed number of channels that are used cyclically for consecutive blocks of the live stream as described previously. In this example, the time-out value for all channels may be the same. For example, the time-out value may be set to the approximate amount of time it takes for the hydra client to receive enough output symbols to regenerate a block of the live stream. Then, when the hydra client is not experiencing any loss of sent packets, the requesting hydra client may send channel join messages at a high enough rate to ensure that all channels are being received at each point in time. And, when packet loss is measured at the hydra client, the hydra client may decide to not receive packets from some channels for a period of time. The hydra client may stop receiving packets from some channels by, for example, not sending a join message that would informs the replication system of its continued interest in receiving packets from the channel. Similarly, the hydra client may stop receiving packets from some channels by, for example, sending a channel join message to the replication system that does not explicitly list some channels, and where the replication system is configured to automatically stop sending packets from channels not explicitly listed in a channel join message.

Time-out values may also be based on an absolute time, measured, for example, by a network clock, a channel clock, etc. This can be achieved, for example, by having a hydra server place a time stamp in some or all outgoing packets. Then, each hydra client may send a channel join message with a time-out value that is an absolute time. For example, suppose the hydra server starts a timer at zero when it first starts generating output symbols for a particular logical channel. If the current value of the timer is 10,000 in units of seconds then a channel join message received from a hydra client with a time-out value of 10,007 for that channel would indicate to the hydra server that all packets for the logical channel should be sent to the hydra client for another 7 seconds. One advantage of this time-out scheme is that if any join messages are accidentally or purposefully sent to the hydra server more than once, then join messages received by the server after the first such join message will not impact on the server. One disadvantage of this time-out scheme is that the hydra clients and the server must be synchronized at least loosely, e.g., by sending the server timer value in some or all data packets.

Any logically consistent set of properties may be combined with any other set of properties. For example, the channels may be logically ordered and a channel join message sent by a requesting hydra client may contain the explicit prefix of channels with the explicit list of time-out values. These time-out values may vary from one join message to another, but, within a particular channel join message, the time-out values may be monotonically decreasing for the different channels specified in the prefix. One skilled in the art will recognize many other equivalents, variations, and alternatives.

A TCP-Like Hydra Server

One disadvantage of the multiple channel hydra server is that it sends packets to individual hydra clients that may have trouble penetrating firewalls, e.g., UDP unicast packets. A second disadvantage is that although there are flow/congestion control protocols designed for the multiple channel hydra server, none of these protocols are currently standardized. A TCP-like hydra server is now described that uses TCP packets and the standardized TCP flow/congestion control. The TCP-like hydra server thus overcomes the two disadvantages mentioned above, while maintaining the high scalability of the hydra server.

For the TCP-like hydra server, the encoding system may use multiple channels per content or a single channel per content, depending on the application and implementation. In either case, it is more efficient (but not necessary) for the encoding system to use a TCP packet format for the sent packets, in order to minimize the changes to the packets that the replication system makes to the packets when it replicates and sends the packets to requesting hydra clients. Alternatively, the encoding system may generate multicast packets and provide the multicast packets to the replication system.

Figure 9:
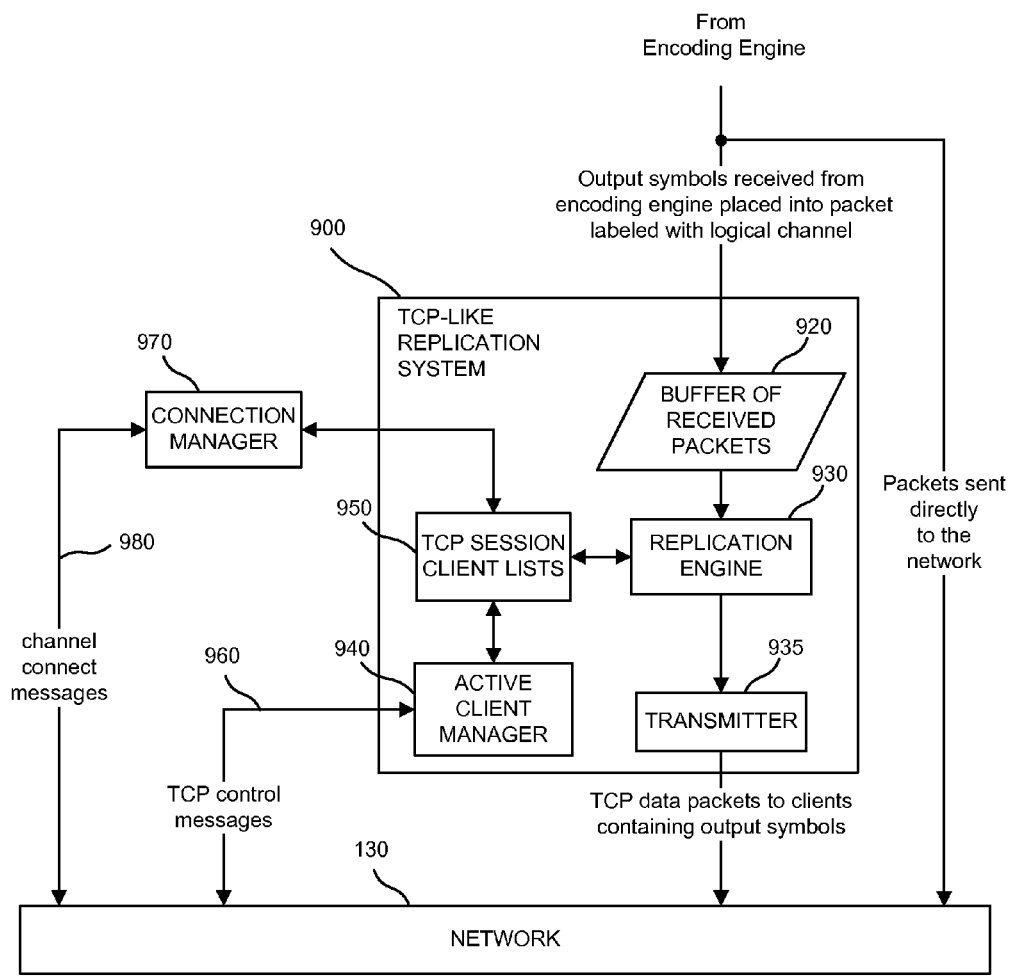
FIG. 9 is a block diagram for a TCP-like replication system for a TCP-like hydra server according to one embodiment of the present invention.

FIG. 9 is a simplified block diagram of another embodiment of a replication system. This diagram is used herein for illustrative purposes only and is not intended to limit the scope of the invention. A replication system 900 of a TCP-like hydra server differs from that of the embodiments described above, including in its interaction with hydra clients. Each packet that arrives to the TCP-like replication system 900 from the encoding system is stored in a buffer of received packets 920 and classified according to the content from which it was generated. An active client manager 940 keeps track of a minimal set of TCP parameters for each requesting hydra client in a TCP session client lists 950. These parameters may include information on a current TCP window such as a current size of the window, a highest sequence number received in a packet such that all previous sequence numbers have also been received, a time-out value for the connection and an estimated round-trip time to the hydra client.

Unlike the TCP-like hydra server, a standard TCP sender would also have to maintain a copy of all the content within the window, which can be tens or hundreds or more of kilobytes of buffer space per requesting hydra client. The reason for this is that a standard TCP sender would have to retransmit portions of this content if the requesting hydra client indicates that packets were lost that contained portions of this content. As described below, maintaining a copy of any portion of the original content is avoided by the TCP-like replication system 900, and this is a significant advantage of the TCP-like hydra server over a standard web or streaming server based on TCP.

In this embodiment of a TCP-like hydra server, a requesting hydra client first establishes a session connection with the server, and then as shown in FIG. 9 establishes a channel connection with the connection manager 970 using a channel connect message 980. The connection manager 970 initializes the TCP session client lists 950 appropriately with the initial TCP parameters for the session between the hydra client and the hydra server. Then, the requesting hydra client uses a standard TCP connection to connect to and receive output symbols contained in TCP packets from the replication system 900. TCP control messages 960 are processed by the active client manager 940, and TCP data packets containing output symbols are sent directly to the hydra client from the replication system 900. The hydra client may regenerate the content using a decoder corresponding to the encoder used by the encoding generator of the TCP-like hydra server, e.g., the encoder/decoder pair described in "Luby I" and "Luby II" could be used. When a packet is to be replicated to a particular hydra client, the replication engine 930 selects a packet in the buffer of received packets 920 received from the encoding engine for the content that has not already been transmitted to the hydra client and transmits that packet. Thus, for example, if the TCP receiver in the hydra client misses a sent packet, the replication engine 930 will send an available packet in the buffer of received packets 920 for the content at that point in time, which would be a packet containing different output symbols than those contained in the missed packet. Thus, the replication engine 930 uses the same buffer of received packets 920 as the pool of available packets to send to all hydra clients currently receiving the same content, independent of when the hydra clients started their reception and independent of the different loss patterns of the different hydra clients.

The TCP receiver of a requesting hydra client sends back to the active client manager 940 standard TCP control acknowledgment packets 960. The active client manager 940 processes these packets to update the TCP parameters it maintains for each hydra client for each TCP session in the TCP session client lists 950. The replication engine 930 uses these TCP parameters to send TCP packets with the same TCP packet header and at the same rate at each point in time as a standard TCP sender would send packets. The replication engine 930 also updates the TCP session client lists 950 appropriately each time it sends a packet to a hydra client.

Thus, the flow/congestion control used for each requesting hydra client receiving packets from the TCP-like replication system 900 is the standard TCP protocol, but the content of the packets is quite different than for a standard TCP connection, as they contain output symbols generated from the original content instead of portions of the original content.

There are some advantages of the TCP-like hydra server over a standard web or streaming server and over a multiple channel hydra server. One advantage is that the TCP-like hydra server can support orders of magnitude more clients than a standard web or streaming server. Additionally, an advantage of a TCP-like hydra server over the embodiments of multiple channel hydra servers described above is that it uses a standardized flow/congestion control protocol and a packet format that can penetrate firewalls more easily.

The TCP-like hydra server may be used for a variety of applications. For example, for a download application, output symbols for content can be generated and sent to the TCP-like replication system 900 in TCP packets at a rate that is at least that of the highest reception rate of any requesting hydra client currently receiving packets. The active client manager 940 may keep track of the TCP parameters of each requesting hydra client in the TCP session client lists 950. The replication engine 930 may copy packets from the buffer of received packets 920 and send the replicated packets to each requesting hydra client, and may also appropriately update the TCP session client lists 950. Each requesting hydra client may use a standard TCP receiver to receive the packets. The standard TCP receiver may then pass the output symbols included in the received TCP packets to the decoder, and the decoder may regenerate the original content from the output symbols.

As another example, for an on-demand streaming application, the output symbols for different segments of the content may be generated and placed into TCP packets and sent to the TCP-like replication system 900. In this case, packets for each segment are organized into different segment buffers in the buffer of received packets 920 within the replication system 900. Output symbols for each segment should be generated at a high enough rate so that hydra clients can regenerate the segments and send them to the streaming application player on the hydra client machine in a manner so that the content can be played out at the full play out rate on the hydra client machine from start to end, without interruption, and after a short startup period at the beginning of the reception. The delivery system may be designed so that if the packet loss rate of a requesting hydra client is on average below a delivery system maximum loss rate, then seamless play out by the hydra client machine will be achieved. If the packet loss rate is higher than the maximum, then the hydra client machine may pause occasionally in the play out. For example, embodiments of such a delivery system is described in "Media On-Demand Application", and these embodiments may be adapted to the TCP-like hydra server. In these embodiments, requesting hydra clients may use a standard TCP receiver to receive packets sent from the replication system 900 and pass the output symbols contained in the TCP packets to the decoder. In these embodiments, additional information may be maintained within the TCP session client lists 950 by the active client manager 940 and/or the replication engine 930. Additionally, the active client manager 940 and/or the replication engine 930 may include additional logic to maintain and use this additional information to determine from which segment buffer the packet to be sent to the requesting hydra client should be chosen from within the buffer of received packets 920.

As a third example, for a live streaming application, the output symbols for the different blocks of the stream of live content may be generated and sent to the TCP-like replication system 900 in TCP packets. In some embodiments, the buffer of received packets 920 may include a plurality of block buffers so that packets for each block may be organized in the block buffers. Output symbols for each block should be generated at a high enough rate so that hydra clients may regenerate the blocks and send them to the streaming application player on the hydra client machine in a manner so that the live content can be played out at the full play out rate from the point that the hydra client started receiving the live content after a short startup period. In these embodiments, the delivery system may be designed so that if the packet loss rate of a requesting hydra client is on average below a delivery system maximum loss rate, then seamless play out by the hydra client machine may be achieved. But, if the packet loss rate is higher than the maximum loss rate, then the hydra client machine may skip portions of the play out, or may play out portions at lower quality. Requesting hydra clients may use a standard TCP receiver to receive packets sent from the replication system 900, which may pass output symbols included in the TCP packets to a decoder. In these embodiments, additional information may be maintained within the TCP session client lists 950 by the active client manager 940 and/or the replication engine 930. Additionally, the active client manager 940 and/or the replication engine 930 may include additional logic to maintain and use this additional information to determine from which block buffer the packet to be sent to the requesting hydra client should be chosen from within the buffer of received packets 920.

When hydra clients are able to receive packets from logical channels that are sent directly to the network from the encoding system, similar logic for joining and leaving logical channels may be used for a hydra client receiving the packets directly from the encoding system as is used by a requesting hydra client receiving packets from the replication system. In some embodiments, for example, the encoding system of the TCP-like hydra server may be modified to send output symbols in TCP packet format to the replication system 900 and also send output symbols in UDP multicast packet format directly through a network for access by hydra clients that have a multicast connection with the server. This may be an advantage in that the reception behavior and experience of hydra clients may be similar independent of whether they are receiving UDP multicast packets sent directly to the network by the encoding system or whether they are receiving TCP packets requested from and replicated by the replication system 900. Thus, the experience of a hydra client may be independent of whether the network that connects it to the TCP-like hydra server is fully multicast enabled.

The TCP-like hydra server may use HyperText Transport Protocol (HTTP) as the overall connection protocol on top of TCP, in order for the hydra client to receive packets through firewalls.

Multiple Encoding Systems and Replication Systems

Figure 10A:
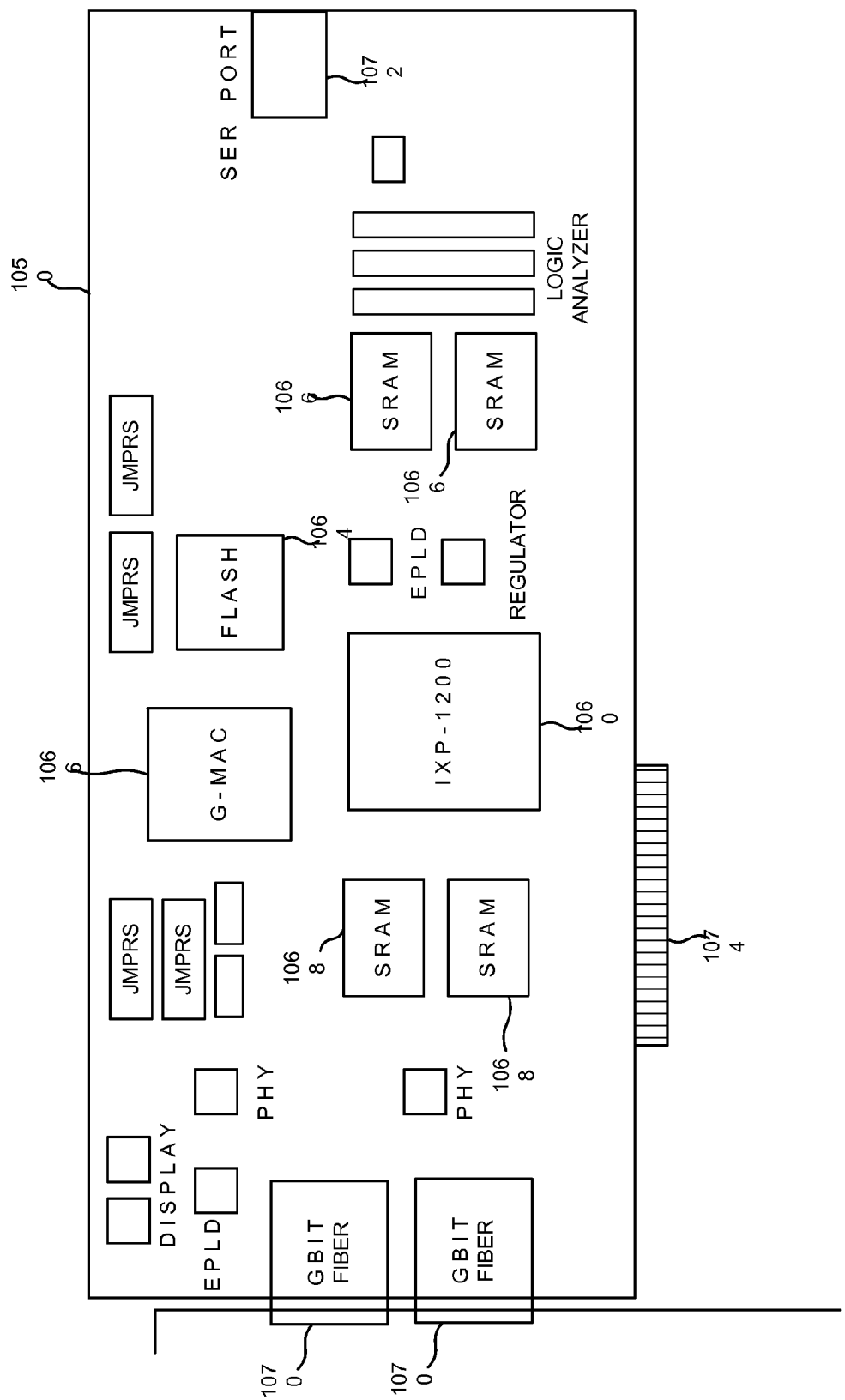
FIG. 10A is a block diagram of a possible implementation of a replication system on a Network Interface Card (NIC) card according to one embodiment of the present invention.

It should be understood that many different configurations for encoding systems and replication systems are possible. For example, one encoding system and one replication system could be included within one physical box. In this example, the encoding system and the replication system may be all within one physical box, although internally within the box they may be on a same platform, or running on different platforms that communicate through standard means. For example, the box could be a standard 1 U rack mounted unit. The encoding system could be implemented on a standard PC platform that is included within the box, with a standard CPU, RAM, disks, etc. The replication system could be implemented on a standard network interface card (NIC), and communication between the encoding system and the replication system could be via a standard peripheral component interconnect (PCI) bus. FIG. 10A is a block diagram of a Network Interface Card (NIC) on which a replication system can be implemented according to one specific embodiment of the present invention. The NIC 1050 includes an Intel® IXP-1200 processor 1060, a Gigabit Ethernet Media Access Control (G-MAC) controller 1062 that implements G-MAC layer functions, flash memory 1064, synchronous dynamic random access memory (SDRAM) 1066, static random access memory (SRAM) 1068, fiberoptic transceivers 1070, a serial port 1072, and a PCI bus connector 1074.

Figure 10B:
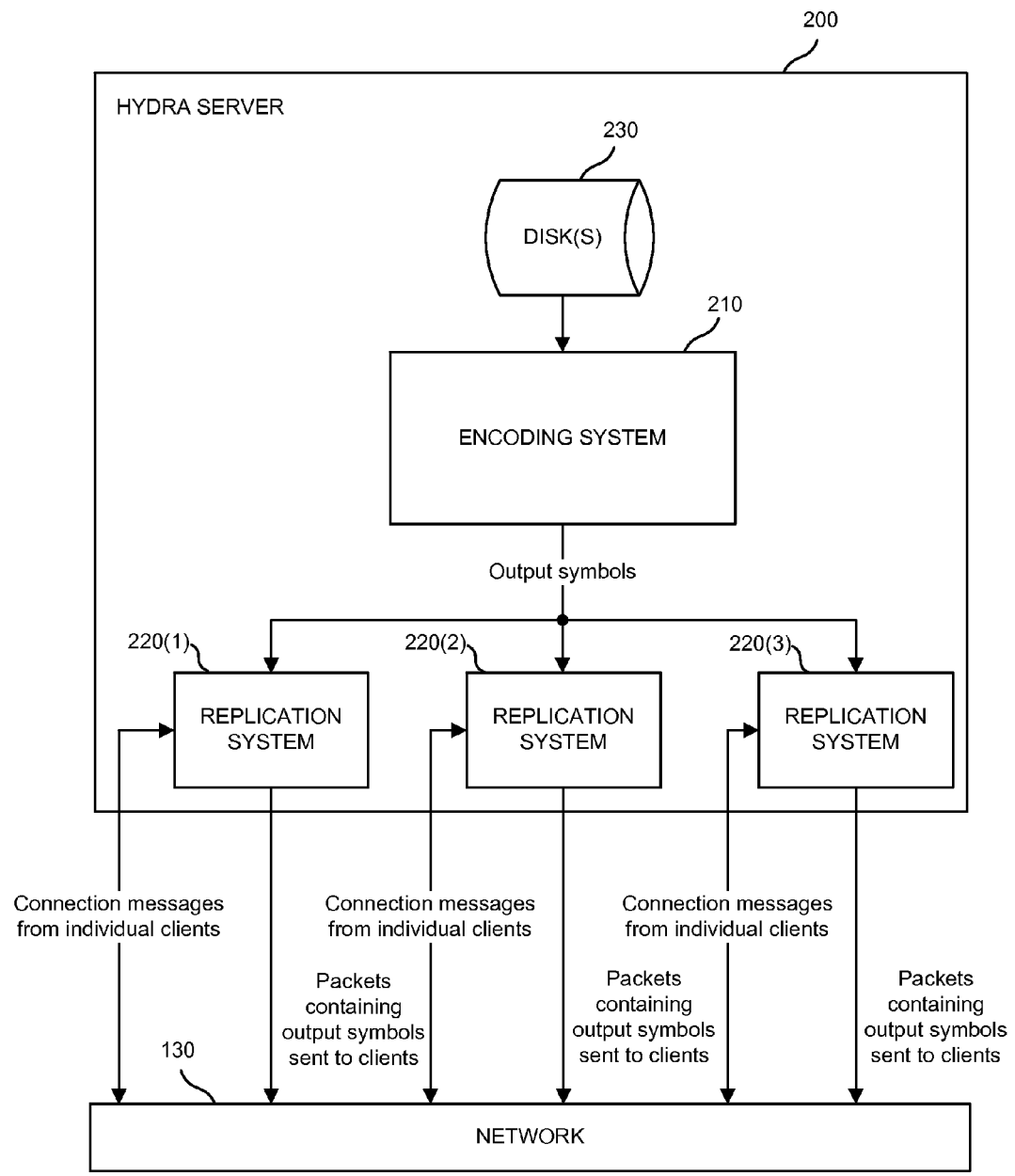
FIG. 10B is a block diagram for hydra server with three replication systems according to one embodiment of the present invention.

As another example, as shown in FIG. 10B, one encoding system and several replication systems could be included within one physical box. In this example, the encoding system 210 may send output symbols to all three replication systems 220(1), 220(2) and 220(3) indiscriminately, or the encoding system may instead send each replication system only portions of the output symbols for which the receiving replication system has current requesting hydra clients that it is servicing.

Figure 11:
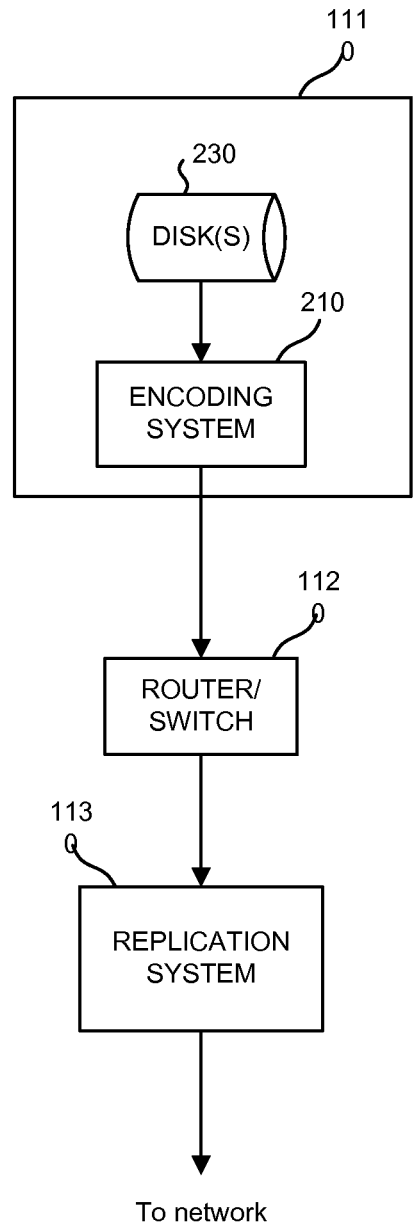
FIG. 11 is a block diagram for a simple distributed hydra server system according to one embodiment of the present invention.
Figure 12:
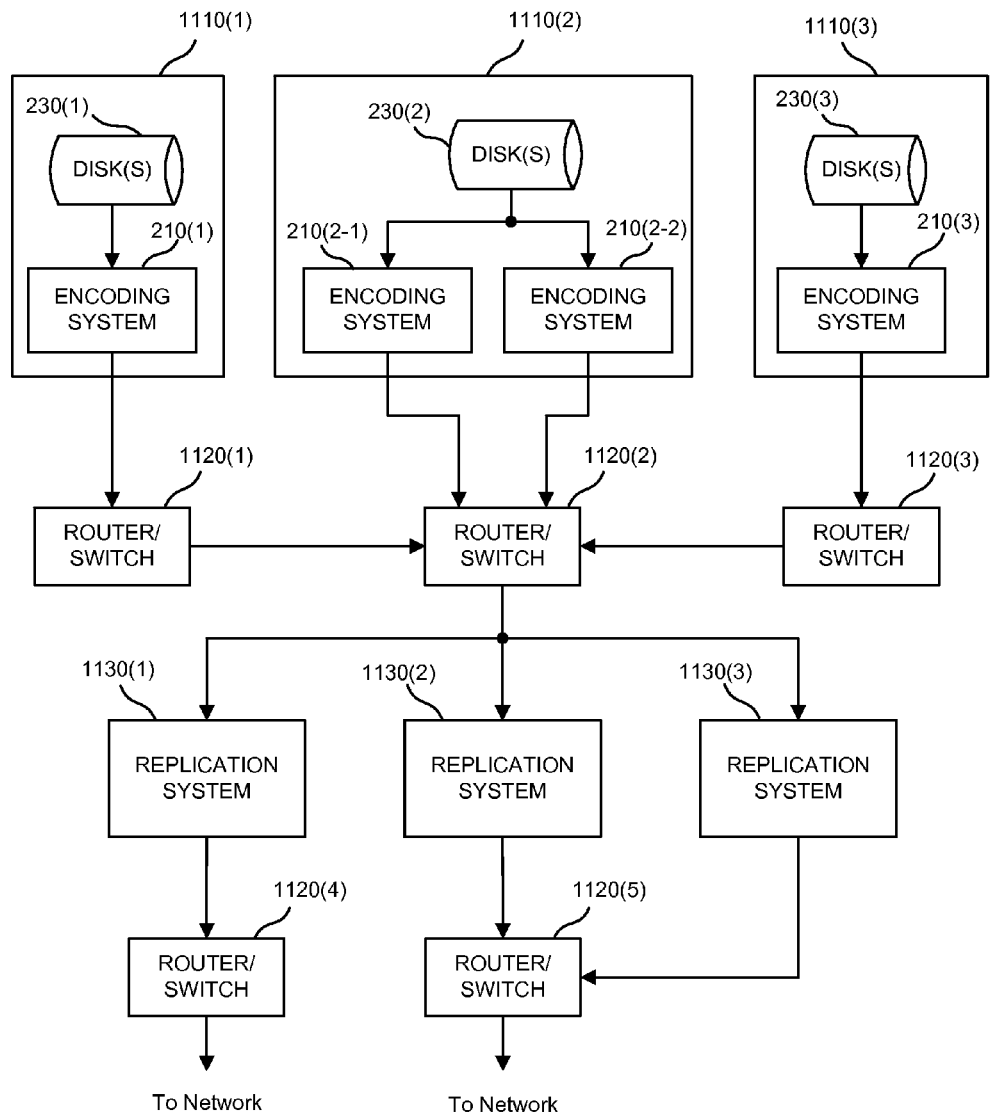
FIG. 12 is a block diagram for a more complex distributed hydra server system according to one embodiment of the present invention.

As yet another example, as shown in FIG. 11, an encoding system and a replication system may each be in a separate physical box, and the boxes may be logically coupled through a network such as, for example, an Ethernet, an internet, the Internet, an extranet, a local area network (LAN), or other types of similar connections. Similarly, as shown in FIG. 12, a plurality of encoding systems may be included in one or more boxes, and a plurality of replication systems may be included in one or more boxes separate from the encoding systems. These boxes may all be collocated in close proximity to one another, or in clusters of close proximity boxes with other clusters far apart, or any combination thereof. For example, there could be a farm of one or more encoding systems at a central collocated facility, and the replication systems are spread out to the edges of a network remotely. Or, there could be a farm of one or more encoding systems that are interconnected to a farm of one or more replication systems that are all collocated in a central facility. One skilled in the art will recognize many other equivalents, variations, and alternatives.

Format of Output Symbols Sent from Encoding System to the Replication System

In the above described embodiments, a replication system receives packets of output symbols. It is to be understood, however, that the replication system need not receive output symbols in packets. Rather, in some embodiments, it may be useful to provide output symbols to the replication system in a non-packet format. For example, this may be useful in embodiments in which an encoding system and a replication system are implemented on a same platform, within a same physical box, etc. In these embodiments, the replication system may assemble received output symbols into packets for transmission to requesting hydra clients.

Additionally, it is to be understood that, in some embodiments, the replication system may receive output symbols in packets and, rather than transmit the output symbols in the received format, the replication system may reformat the output symbols before transmitting the output symbols in replicated packets. For example, a first packet received by the replication system may include output symbols E1, E2 and E3, whereas a second received packet may include output symbols E4, E5 and E6. Then, the replication system may send a packet containing E1, E5 and E3 to a requesting hydra client, and may never send output symbols E2, E4 or E6 to that same requesting hydra client. One skilled in the art will recognize many other equivalents, variations, and alternatives.

A Combined Hydra Server

A hydra server may be a combination of a multiple channel hydra server and a TCP-like hydra server, as well as sending packets to the network directly from the encoding system. It may be more efficient for the hydra server to send packets directly to the network from the encoding system, and more efficient to serve using the multiple channel hydra server than the TCP-like hydra server. These efficiencies can be measured in terms of impact on the resources of the hydra server, most notably the impact on the replication engine within the replication system. On the other hand, it may be harder for hydra clients to receive UDP multicast packets sent directly to the network by the encoding system than it is for hydra clients to receive UDP unicast packets from the multiple channel hydra server, and this may be more difficult than it is for hydra clients to receive TCP packets from the TCP-like hydra server. The reasons for these difficulties could be because some firewalls allow TCP packets to pass through but do not let UDP unicast packets pass through, and some firewalls allow UDP unicast packets to pass through but do not let UDP multicast packet pass through. Furthermore, in general the entire Internet can route TCP packets and UDP unicast packets from any point to any other point, but this may not be the case for UDP multicast packets because of the lack of ubiquitous deployment of multicast across the Internet.

In one specific embodiment, a hydra server supports three methods for delivery of content to hydra clients: UDP multicast, UDP unicast, and TCP. In this embodiment, a hydra client could be configured, for example, to first try and receive UDP multicast packets from the hydra server. If the hydra client is unable to receive the UDP multicast packets, for example, because of an intervening firewall, because of lack of multicast deployment, or any other reason, the hydra client could then become a requesting hydra client for UDP unicast packets. If the hydra client is unable to receive the UDP unicast packets, for example, because of an intervening firewall or any other reason, the hydra client could then become a requesting hydra client for TCP packets. The TCP connection may be made using the HTTP protocol. In other embodiments, a hydra server may support any two of the above-described three methods, or a hydra server may support any one of the above-described three methods for delivering content to hydra clients. Furthermore, when session initialization is made, the hydra client may be given a URL to a standard web or streaming server that the hydra client uses as a last resort to receive packets for content if all methods available on the hydra server fail.

In another embodiment, a hydra client may first makes a session request to the hydra server or another specified server, e.g., a standard web or streaming server, and the hydra client receives in response to the session request a description of the session, including relevant information the hydra client may need for different methods by which the hydra client may try to access the content. First, the hydra client may attempt to receive UDP multicast packets. If this fails, then the hydra client may try connecting to the multiple channel hydra server or other specified server to receive UDP unicast packets by sending a connect message. If the hydra server or other specified server responds, then the hydra or other specified server includes in the response the replication system address that the hydra client should send join messages to in order to receive packets for the content.

If multiple replication systems are being used to service requesting servers, the hydra server or other specified server may choose which replication system address to send to the requesting hydra client based on a number of factors. These factors could include the current capacity of each replication system to handle additional requesting hydra clients, it could include how the content has been assigned to the different replication systems for handling, it could include the network vicinity of the replication systems to the requesting hydra client and to the encoding systems, it could include the abilities of the different replication systems to handle multiple channel and TCP-like requests, and it could include any number of other factors. Thus, load balancing and network resource optimization can be achieved by sending the requesting hydra client the address of the appropriate replication system. If the connection response is received by the hydra client, then the hydra client starts sending join messages as described previously to start receiving packets for the requested content.

If the hydra client is unable to receive UDP unicast packets, then the hydra client may try connecting to the hydra server or other specified server to receive TCP packets by sending a connect message. The overall protocol used for this connection may be HTTP. If the hydra server or other specified server responds, then the hydra or other specified server may include in the response the replication system address that the hydra client should send join messages to in order to receive packets for the content. If multiple replication systems are being used to service requesting servers, the hydra server or other specified server may choose which replication system address to send to the requesting hydra client based on a number of factors as described above. If the connection response is received by the hydra client, then the hydra client and the replication system establish a TCP connection, possibly using HTTP, to start receiving packets for the requested content.

It is to be understood that many other configurations are possible. For example, the hydra server may not support all methods, and the hydra client may be configured to try connecting to a standard web or streaming server if all possible methods of receiving packets from the hydra server fail. As another example, the session control, channel connect and channel join messages sent by a hydra client to a hydra server or other specified server and response to the requesting hydra client may be UDP based, TCP based, HTTP based, etc. Also, there may not be a separate connect message and response for connecting via the multiple channel and the TCP-like methods, i.e., the connect message response may specify the replication system for either method and the any other information needed to start receiving packets using either method. One skilled in the art will recognize many other combinations, variations, alternatives, and equivalents.

Receiving from Multiple Logical Channels

A requesting hydra client may join and receive packets from multiple logical channels that are being generated by one or more encoding systems in one or more locations. There are many reasons for doing this. For example, for reliability it may be the case that two or more encoding systems are running on different hydra servers generating output symbols on different logical channels for the same content. Then, a hydra client may be configured to request receive packets sent to both logical channels. If one of the hydra servers crashes, or the network infrastructure between one of the hydra servers and the hydra client becomes overwhelmed or inoperable, or for any other reason the connection between the hydra client and one of the hydra servers is lost either temporarily or permanently, then the hydra client can still receive packets for the content from the remaining hydra server.

As another example, the hydra client may request packets from two or more logical channels in different packet formats. For example, the hydra client may request packets to be sent using TCP packets from one logical channel and using UDP unicast packets from another logical channel concurrently. In this case, if both channels are operating then the reception rate of the hydra client can be increased, but if one of the channels is inoperable, e.g., the UDP unicast packets cannot be received because of an intervening firewall, then at least the hydra client can benefit from the received TCP packets.

As a third example, in some cases the overall delivery can be improved beyond what is possible using a single hydra server. For example, suppose a hydra server can only generate output symbols at a total aggregate rate of 100 Mbps, and yet hydra clients are able to receive content at 200 Mbps. Then, two hydra servers can generate output symbols for the same content, each at 100 Mbps, and the hydra client can request and receive packets from both servers at an aggregate rate of 200 Mbps. Thus, from the perspective of the hydra client, two hydra servers are twice as powerful for delivering a given content as one hydra server, and 10 hydra servers are 10 times as powerful as one, assuming the hydra client has the capacity to receive packets at the aggregate rate of 10 servers. In contrast, this property may be much harder or impossible to achieve with standard web or streaming servers.

As a fourth example, the bandwidth connection between a hydra client and a single hydra server may be quite limited, e.g., a 1 Mbps connection. On the other hand, the hydra client may have largely independent connections to a number of hydra servers, e.g., 10 hydra servers with a total aggregate bandwidth from the servers to the hydra client of 10 Mbps. Thus, if all hydra servers are generating and sending output symbols for the same content, then the hydra client can be configured to concurrently request and receive packets from all 10 servers, thereby effectively increasing the reception rate of the hydra client by a factor of 10 over receiving from just one server.

Another example is for flow/congestion control, e.g., as described in "Dynamic Layering Application". A single hydra server or multiple hydra servers can generate output symbols for content and send this to multiple logical channels. Then, a hydra client can dynamically adjust its packet reception rate by joining and leaving these channels.

One skilled in the art will recognize many other examples in which receiving packets from multiple logical channels that are being generated by one or more encoding systems in one or more locations may be useful.

Security Measures

As with all servers, one security concern for a hydra server is that of denial of service (DoS) attacks. These attacks have as their goal to hinder the availability of the content transmission service. This can be done by totally disrupting the service by bringing a server to a crash or by wasting the server resources while serving (or detecting) invalid clients. The wasted resources can be computation cycles, server memory, bandwidth, etc.

Measures against such attacks vary in the case of unicast and multicast transmission.

In the case of multicast, the main danger comes from the possible injection of bad packets by an attacker that provokes an incorrect reconstruction of content. A client will detect that the content has been incorrectly decoded (and report an error to the end-user) by checking a simple hash embedded by the server in the content before encoding. However, unless security measures are put into place, a client will not detect the source of the error, and the attack causes a waste of resources both at the server and at client.

In the case of unicast, the injection of bad packets is much less of problem since the injection of a packet into a unicast stream only affects one client, thus making the attack unattractive in most cases. Below are described DoS defenses in the unicast case for a couple of particular attacks that are considered the easiest to mount.

Two potential DoS attacks in the unicast case are 1) flooding the server with control messages and 2) signing-up virtual clients/victims by spoofing their source IP address.

Some embodiments of the present invention may include countermeasures for these two DoS attacks that use one or more "cookie mechanisms". In one embodiment, every hydra client registering for some session uses two "cookies". The first cookie is used during session initiation that occurs using session control messages. In a specific embodiment, this cookie is a 64-bit value calculated by the server session control module as a function of the download id, the hydra client IP address, the hydra client port, the operation timeout and a server secret key. In other embodiments, the cookie may be a function of one or more of the download id, the hydra client IP address, the hydra client port, the operation timeout, a server secret key, etc. This cookie is sent to a hydra client by a server session control module in response to a get request sent by the hydra client. This cookie represents a credential for the hydra client to send to the server session control module in a start request message in order to receive in a response the necessary information to start a session. The hydra client's cookie is used as a weak hydra client authentication mechanism intended to limit service to authorized hydra clients only. In particular, an attacker client that forges another hydra client's IP address in a get request message sent to the server session control module will not get back the cookie, since the response message containing the cookie will instead be directed by the server session control module to the forged IP address. When a hydra client tries to initiate a session by sending a start request message to the server session control module the start request message must contain the cookie, which the server session control module checks for validity. The validity of the cookie received from the hydra client is checked by the server session control module by recalculating the cookie from the same information it was originally calculated from and comparing this with the received cookie. If the recalculated cookie and the received cookie do not match then the session is not served. Thus, the server session control module does not save any state information in response to the initial get request message.

While this provides for a way to eliminate unauthorized service requests at the server and prevent the server from saving a lot of state information due to invalid requests, it also creates a DoS opportunity: a hydra client attacker can send a multitude of requests with random cookies. The attacker will not receive service but will force the server session control module to waste CPU cycles in performing the cookie verification (a first-time verification of each hydra client cookie is a relatively time-consuming operation). However, this attack is not so serious for session initiation, as each hydra client only initiates a session once per download and the session duration is typically a comparatively long interval of time. The server session control module can rate filter get request messages from clients that are trying to initiate sessions to prevent CPU over-consumption.

It would be much more serious if CPU resources were consumed by clients that mount an attack by sending join messages to the replication system. This is because join messages are much more frequent than session initiation messages and are valid for only a short interval of time, and thus it is much more important to have a computationally lightweight mechanism in place to minimize the effect of join message attacks. In one embodiment, a minimal amount of state information is saved within the replication system for each valid hydra client that has already successfully initiated a session. In this embodiment, these hydra clients have been already verified as having legitimate access to the resources of the hydra server using the first cookie. The second cookie is sent by the connection manager in response to a channel connect request sent by a hydra client. The connection manager only sends the response once it has validated the first cookie contained in the connect request sent by the hydra client. The second cookie is a session identifier unique to the hydra client chosen at random by the connection manager and stored in the channel active client lists that is available to the active client manager within the replication system. This second cookie must be contained in each channel join message sent to the active client manager by the hydra client. The active client manager can quickly verify the join message is valid by comparing the received cookie with the cookie stored in the channel active client lists. Only if this check succeeds is the join message considered to be valid.

In the above-described embodiment, two cookie mechanisms are used for DoS countermeasures. It is to be understood, however, that other embodiments may use only one of the above-described cookie mechanisms. Similarly, other embodiments may not include either of the above-described cookie mechanisms.

Throttling Measure

In some embodiments, a server may include a throttling measure to throttle the number of incoming messages into a hydra server. In one embodiment of the replication system, a packet classifier and a throttler may be included. The packet classifier and throttling may be implemented, for example, in micro-code. This enables the replication system to continue operation even if the amount of incoming connect and join messages from hydra clients is very high. The replication system will throttle the number of messages that it handles per second preventing consumption of CPU resources. This can be implemented by discarding received messages without processing if the message reception rate becomes too high, for example if it exceeds a specified threshold. In one embodiment, messages are discarded at random from among the received but not yet processed messages. In another embodiment, most recently received messages are discarded when the reception rate becomes too high.

Licensing

In some embodiments, the hydra server may be equipped with a licensing mechanism that limits the service capabilities. To avoid that these limitations inadvertently assist DoS attackers, the relevant hydra server modules will attempt whenever possible to count only valid requests from a hydra client. Otherwise, if the server is licensed to only handle only, say 10K concurrent clients, a DoS attack can succeed by just flooding the server with 10K invalid requests, even though the server is actually capable of dealing with many more requests simultaneously.

A Detailed Description of a Control Protocol

One embodiment of a control protocol for session control, channel connect and channel joins is now described. The content reception that is being controlled may be a file, a stream or some other form of data. The control protocol itself, however, is independent of the type of the content. Output symbols for content may be transmitted in packets in one or more channels. The use of multiple channels allows the hydra client to adjust its reception rate during the transfer by changing the channels to which it is joined, and it allows the hydra client to control receiving different portions of the content at different points in time. A session is defined to be the set of all channels used by a server in the transmission of a single content.

The presently described embodiment of a control protocol has the following functions:
- Initiations of the reception, including exchange of session information and facilitation of server side accounting.
- Initiation and control of the unicast data transfer. This is typically only needed in the case where multicast is unavailable.
- Session monitoring, facilitating server side accounting.
- Session tear down, facilitating server side accounting and collection of client statistics.
- Firewall integration to allow control messages and data packets implemented over UDP to get through firewalls.

Control Protocol Overview
Content Transfer

The logical flow of the control protocol for content transfer comprises the following operations.

GET SESSION DESCRIPTION. Session control messages between a client and a server are used. The client sends a request for the session information to a server. The server responds by sending the session description and a security cookie to be used in subsequent requests made by the client. The client sends a start request containing the security cookie to the server. If the security cookie in the request matches the one that was sent to the client, the server responds by sending a start response to the client. At this point in the protocol, the client should have all of the information required to join the session, collect output symbols included in multicast packets, and reconstruct the original content from the received output symbols once they are received.

MULTICAST DATA TRANSFER. The transfer of output symbols from server to client can be made over multicast or unicast. In the case of a multicast transfer, the client issues IGMP joins for the channel carrying the session and begins receiving the output symbols carried in multicast packets within the channel. When enough output symbols have been received, the client leaves the session by issuing IGMP leave for the channel. The case of a unicast transfer is described below.

HEARTBEAT. Session control messages between a client and a server are used. The start response received by the client in the "GET SESSION DESCRIPTION" step includes a session timeout after which the session is not guaranteed to be available. If the session timeout approaches while the data transfer is still in progress, the client sends a heartbeat message to the server. The server responds with a heartbeat acknowledgment that contains an extended timeout for the session. This heartbeat operation is repeated each time the timeout approaches while the transfer is in progress. If the server does not receive the heartbeat in time, it will consider the transfer to have failed.

DONE. Session control messages between a client and a server are used. The client sends a done message to the server once the data transfer operation has completed. The server responds by sending a done acknowledgment to the client.

Unicast Data Transfer

In the case of a unicast transfer, the protocol comprises the following operations, rather than those described above in the "MULTICAST DATA TRANSFER" step.

CONNECT. Channel connect messages between a client and a server are used. Before the client may receive output symbols via unicast packets, it obtains additional information about the session. The client obtains this information by sending a connect request to the server's connection manager component. The connection manager responds with a connect response message that includes the address of the replication system that will send output symbols to the client and a timeout value for the channel.

JOIN. Channel join messages from a client to a server are used. The client requests to receive packets from the channel associated with the session by sending join messages to the replication system. The replication system responds by sending copies of packets received on the channel from the encoding system to the client in unicast packets until the timeout interval expires. The client repeatedly sends join messages to the server to renew the timeout values appropriately until the client has collected enough output symbols to reconstruct the content.

In the presently described embodiment, a typical usage scenario comprises a Get Session Description operation, followed by an attempted Multicast Data Transfer. A Unicast Data Transfer will occur if the Multicast Data Transfer fails. In either case, Heartbeat operations will occur during and a Done operation will follow the data transfer.

Congestion Control

In the description above, the session comprises a single channel that a client must join to receive output symbols from a server. In general, however, a session may comprise one or more channels, each carrying output symbols for the content. It then becomes possible for the client to adjust its reception rate during the transfer simply by changing the set of channels to which it is joined. This may be a basis of a congestion control method used by the client.

In the case of a multicast transfer, the congestion control method may result in the client performing IGMP join and leave operations throughout the transfer.

In the case of a unicast transfer, the connect response may include a list of the timeout values for all of the channels in the session. In the join message, the client indicates the list of all channels it wishes to be joined to. Throughout the download, the client continues to send join messages to the replication system.

Control Protocol Details

In some embodiments, the control protocol may be implemented over UDP, which provides best-effort delivery. The Get Session Description, Heartbeat and Done operations may be made more reliable by the use of timers and request retransmission by a client. In a specific embodiment of a server, there may be three distinct components that participate in the protocol: a server session control module, a connection manager and a replication system. In this embodiment, the server session control module and the connection manager may share an IP address (though, in general, this need not be the case) while the replication system may have its own IP address.

A detailed description of the control protocol operations is provided below.

Get Session Description Operation

Figure 13:
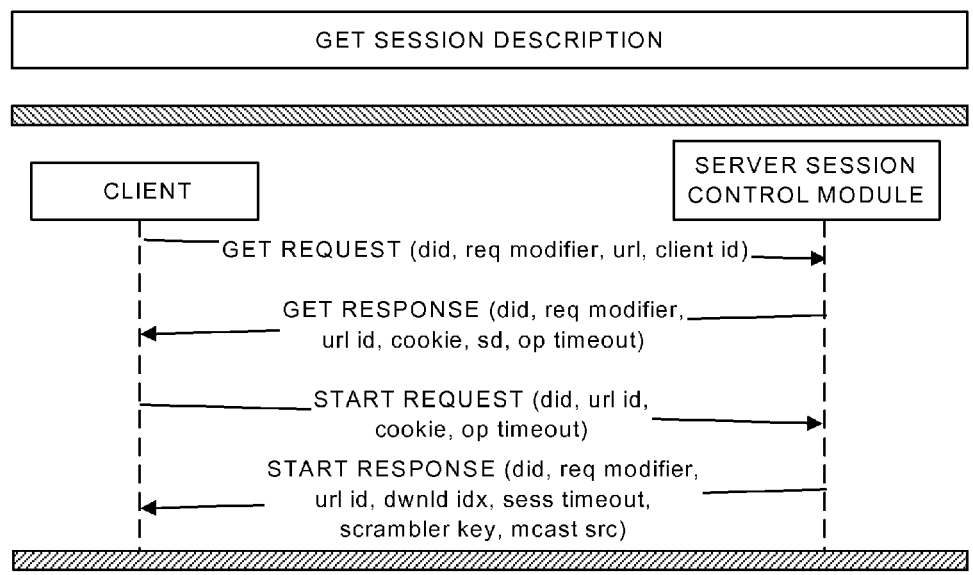
FIG. 13 is a flow diagram for a Get Session Description protocol according to one embodiment of the present invention.

FIG. 13 is a simplified diagram of one embodiment of a Get Session Description operation. This diagram is used herein for illustrative purposes only and is not intended to limit the scope of the invention. The Get Session Description operation includes the following message types and protocol flow.

Get Request Message
|control header|<download id tlv><request modifier tlv><url tlv>[<client id tlv>]|

The download id is a 64-bit value constructed by the client as the concatenation of the client IP address and a 32-bit random number.

The request modifier is used to indicate whether the client is initiating a multicast or unicast transfer.

The url is a string identifying the content the client wishes to transfer.

The client id is an optional identifier of the client.

Get Response Message

| control header | <download id tlv><request modifier tlv><url id tlv><security cookie tlv><session description tlv><operation timeout tlv> |

The download id is the one sent in the get request message.

The request modifier is used to indicate whether the get request was successful. If the get request fails, the request modifier indicates the reason it failed.

The url id is a unique value that the server associates with the url string that was sent in the get request message. It is used so that the string need not be included in subsequent messages.

The security cookie may be a 64-bit value calculated by the server as a function of one or more of the download id, the client IP address, the client port, the operation timeout and a server secret key. One role of the cookie is to protect the server from denial of service attacks. The server does not create state for the client until a start request with a valid cookie is received. By issuing cookies, the server is able to control the number of clients for which it must maintain state.

The session description includes information needed by the client to initiate the transfer of output symbols from the server over multicast or unicast.

The operation timeout is an absolute time after which the server may not accept the start request. If the start request is rejected, the client must restart by sending another get request with a new download id.

Start Request Message

| control header | <download id tlv> <url id tlv> <security cookie tlv> <operation timeout tlv> |

The download id is the one sent in the get request message and received in the get response message.

The url id is the one received in the get response message.

The security cookie is the one received in the get response message.

The operation timeout is the one received in the get response message.

Start Response Message

| control header | <download id tlv> <request modifier tlv> <url id tlv> <download index tlv> <session timeout tlv> <scrambler key tlv> [<multicast source tlv>] |

The download id is the one sent in the start request message.

The request modifier is used to indicate whether the start request was successful. If the start request fails, the request modifier indicates the reason it failed.

The url id is the one sent in the start request message.

The download index is a unique value that the server uses to identify the client's connection to the session. The download index is used by the client to authenticate itself to the server in the heartbeat and done request messages described below. This helps to protect the client from attacks in which heartbeat or done requests are sent on its behalf.

The session timeout is an absolute time after which the session is not guaranteed to be available. The client extends the timeout by sending a heartbeat message described below.

The scrambler key, the key to a lightweight encryption mechanism, is required by the client to reconstruct the original content from the output symbols.

The multicast source information is optionally included to allow firewalls to open a window for the inbound multicast traffic.

Heartbeat Operation

Figure 14:
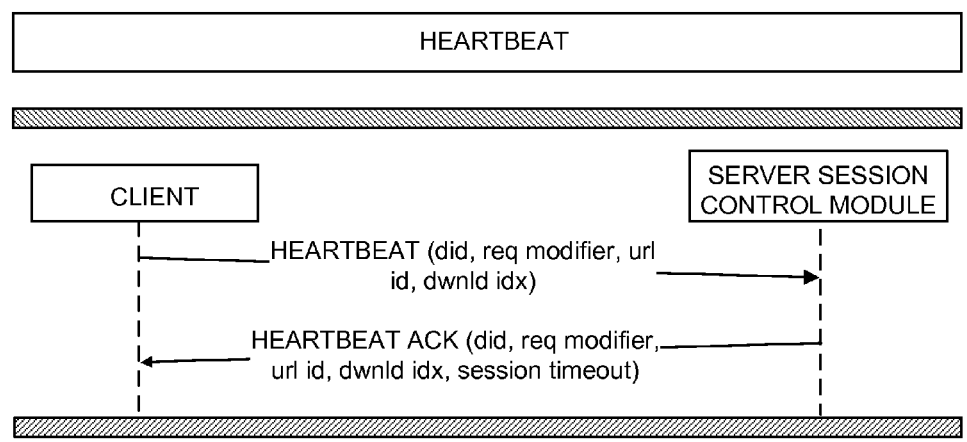
FIG. 14 is a flow diagram for a Heartbeat protocol according to one embodiment of the present invention.

FIG. 14 is a simplified diagram of one embodiment of a Heartbeat operation. This diagram is used herein for illustrative purposes only and is not intended to limit the scope of the invention. The Heartbeat operation includes the following message types and protocol flow.

Heartbeat Message

| control header | <download id tlv> <request modifier tlv> <url id tlv> <download index tlv> |

The download id is the one used in the messages of the Get Session Description operation. The request modifier is used to indicate whether the client is initiating a multicast or unicast transfer. The url id is the one used in the messages of the Get Session Description operation. The download index is the one used in the messages of the Get Session Description operation.

Heartbeat Acknowledgment Message

| control header | <download id tlv> <request modifier tlv> <url id tlv> <download index tlv> <session timeout tlv> |

The download id is the one sent in the heartbeat message. The request modifier is presently unused. The url id is the one sent in the heartbeat message. The download index is the one sent in the heartbeat message. The session timeout is the one received in the start response message of the Get Session Description operation.

Done Operation

Figure 15:
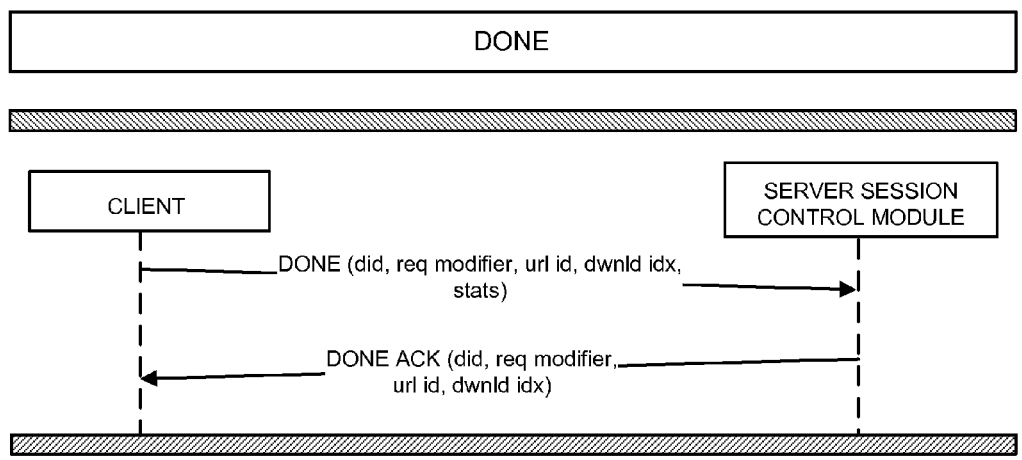
FIG. 15 is a flow diagram for a Done protocol according to one embodiment of the present invention.

FIG. 15 is a simplified diagram of one embodiment of a Done operation. This diagram is used herein for illustrative purposes only and is not intended to limit the scope of the invention. The Done operation includes the following message types and protocol flow.

Done Message

| control header | <download id tlv> <request modifier tlv> <url id tlv> <download index tlv> [<download statistics tlv>] |

The download id is the one used in the messages of the Get Session Description operation. The request modifier is used to indicate whether the transfer completed, was canceled or failed. The url id is the one used in the messages of the Get Session Description operation. The download index is the one used in the messages of the Get Session Description operation. The download statistics are optional statistics about the data transfer.

Done Acknowledgment Message

| control header | <download id tlv> <request modifier tlv> <url id tlv> <download index tlv> |

The download id is the one sent in the done message. The request modifier is presently unused. The url id is the one sent in the done message. The download index is the one used in the done message.

Unicast Data Transfer Operation

Figure 16:
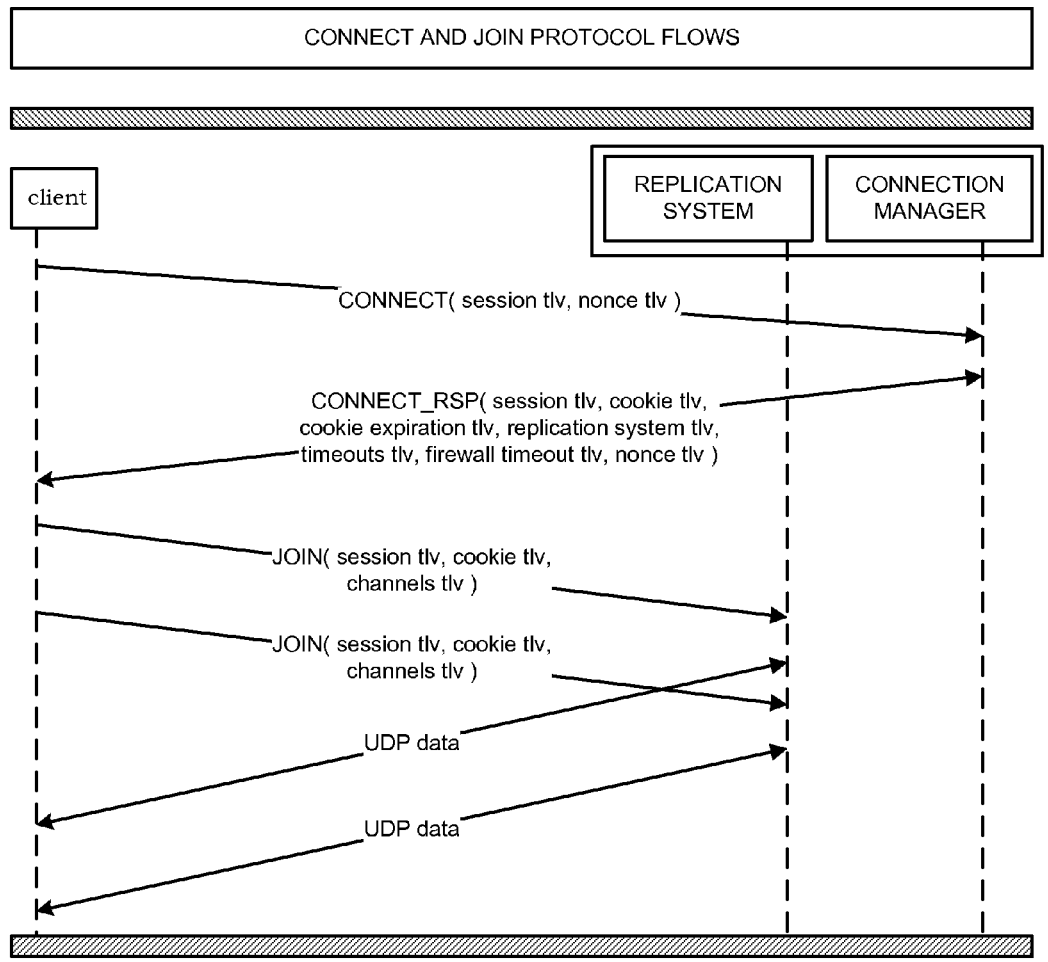
FIG. 16 is a flow diagram for a Connect and Join protocol according to one embodiment of the present invention.

FIG. 16 is a simplified diagram of one embodiment of a Unicast Data Transfer operation. This diagram is used herein for illustrative purposes only and is not intended to limit the scope of the invention. The Unicast Data Transfer operation includes the following message types and protocol flow.

Connect Message

|control header|<session tlv>[<nonce tlv>]|

The session field is constructed by the client from information found in the session description in the get response message of the Get Session Information operation. The nonce is an optional value constructed by the client. If the nonce appears in the connect message, then the corresponding connect response must also include it.

Connect Response Message

There are two formats of the connect response message, depending on whether the connect operation fails or succeeds.

|control header|<session tlv><error tlv>[<nonce>]|

The session field is the one sent in the connect message. The error field identifies the error that occurred when the server attempted to process the connect request. The nonce is the one optionally sent in the connect message.

| control header | <session tlv> <security cookie tlv> [<cookie expiration tlv>]
Replication system tlv> <timeouts tlv> [<firewall timeout tlv>]
[<nonce>] |

The session field is the one sent in the connect message. The security cookie is a 64-bit value calculated by the server to be used in all subsequent join messages for this session. The cookie expiration optionally indicates the time at which the security cookie will expire. If the cookie expiration does not appear, then the cookie never expires. The replication system field contains the IP address and port of the replication system that will serve the session to the client. The timeouts are the individual timeout values for the channels in the session.

The firewall timeout is optionally included to tell firewalls how long to open the window for outgoing join messages and incoming output symbols contained in packets associated with this session. If the firewall timeout does not appear, then the firewall should use its own standard timeout. The nonce is the one optionally sent in the connect message.

Join Message

|control header|<session tlv><security cookie tlv><channels tlv>|

The session field is the one sent in the connect message. The security cookie is the one received in the connect response message. The channels field indicates which channels of the session the client wishes to join.

Output Symbols Messages

The output symbols messages are encoded in the LCT format. For additional details of the LCT format, see the Layered Coding Transport Internet Engineering Task Force (IETF) draft within the Reliable Multicast Transport (RMT) working group.

Figure 17:
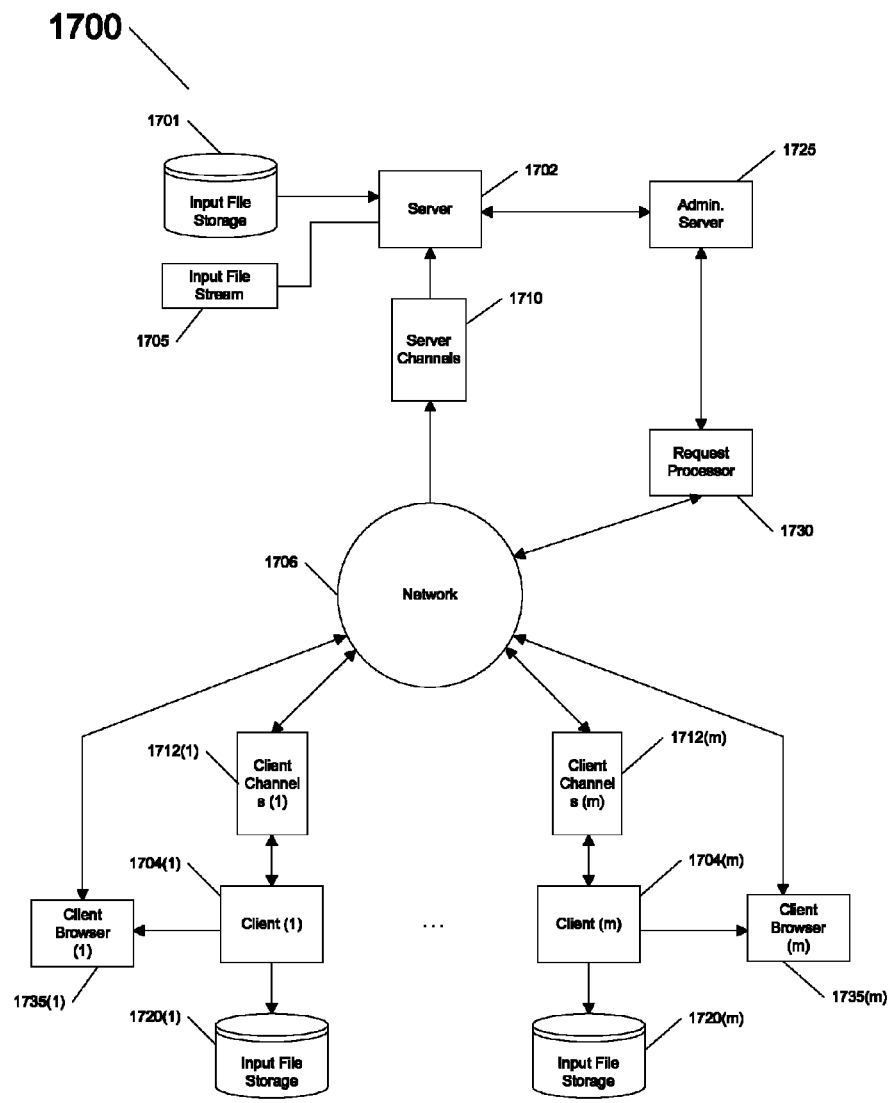
FIG. 17 is a block diagram of a file transmission system with one server and m clients.

FIG. 17 illustrates one embodiment of a file transmission system 1700. A server 1702 serves files to clients 1704 over a network 1706. As shown, file transmission system 1700 includes m clients, but the actual value of m is not particularly relevant to this description. In a preferred embodiment, network 1706 is the Internet, but other networks or subsets of the Internet can be used as well, such as intranets, virtual private networks, LAN's, WAN's, wireless or satellite networks. In fact, network 1706 need not be a network in the strictest sense of the term, but may be a collection of point-to-point connections.

However configured, server 1702 receives requests for files from clients 1704. In FIG. 17, an administrative server 1725 may determine a schedule of which files are available. The administrative server 1725 may also maintain a list of clients 1704 that are eligible to download a particular file. For instance, in a pay-per-download system, the administrative server 1725 may maintain a list of clients 1704 that have paid and are currently eligible to download a particular file. The administrative server 1725 also may control the server 1702, and may determine a schedule of which files, or portions of a file are to be served. A list of files currently available for download and any other parameters required by the client 1704 may be published by the administrative server 1725 at the request processor 1730. For instance, the request processor 1730 may publish the download rates available, cost, length, and schedule of availability of each file currently being served by the server 1702. The server 1702, administrative server 1725 and request processor 1730 may reside on a single machine, separate machines, or some combination thereof.

Only one administrative server 1725 and request processor 1730 are shown, but it should be understood that other configurations are possible. For instance, in one embodiment a set of servers 1702 may be associated with a single administrative server 1725 and/or request processor 1730. For example, all the servers 1702 in one location or all the servers 1702 serving the same set of files may be associated with a single administrative server 1725. In another embodiment, two or more administrative servers 1725 may be associated with a single server 1702. For example, one server 1702 may have different administrative servers 1725 for different subsets of files being served, and/or for different subsets of clients 1704. Similarly, one request processor 1730 may be associated with multiple administrative servers 1725, and multiple request processors 1730 may be associated with a single administrative server 1725.

The file may be stored in input file storage 1701, but may also be an input file stream 1705 fed to server 1702 from other sources as needed. Only one input file storage 1701 and input file stream 1705 are shown, but it should be understood that other configurations are possible. For instance, in one embodiment, a set of servers 1702 may be fed by the same input file storage 1701 and input file stream 1705. In another embodiment, a server may be fed by two or more input file storages 1701 and input file streams 1705.

The client 1704 may obtain a list of files available using a client browser 1735. The client browser 1735 may obtain the list of files from the request processor 1730 via the network 1706. Note that the channel used by the client browser 1735 may be the same physical channel used by the client 1704. Once the client browser 1735 requests a particular file from the request processor 1730, the client browser 1735 may download a file description from the request processor 1730 which contains information necessary for the client to begin downloading the file. For example, the file description may include the length, set of download rates, and the set of channels available to download the file. The file description may also include the location of the one or more servers 1702 that are currently serving the file. For instance, in a multicast network, the file description may contain a list of multicast groups and the download rate for each multicast group for a file. The client browser 1735 may send the file description to the client 1704.

In one embodiment, the client browser 1735 may be a web browser and the request processor 1730 may be a web server. The client browser 1735 may receive the file description from the request processor 1730 using an http or a similar. However, this is not the only way a client may be alerted to a file becoming available to download. In another embodiment, the request processor 1730 may continuously advertise, on a dedicated set of channels, which files are available and the relevant information required by the client to receive them. The client browser 1735 may maintain a list of available files, or just listen to a dedicated channel to see what is available based on a user request.

For the purposes of describing some of the system constraints, the connection between a server 1702 and network 1706 may be modeled as a plurality of server channels 1710(*i*) and the connection between a client 1704(*i*) and the network 1706 may be modeled as a plurality of client channels 1712(*i*). The server channels 1710 and client channels 1712 may be physical and/or logical channels.

In one embodiment, the client 1704 and server 1702 may be connected via a multicast network. A server may send all packets destined for a particular logical channel to a particular multicast group. The client may join and/or leave a particular logical channel by joining and/or leaving the particular multicast group. A join or a leave message propagates through the network towards the server up to the first router that can service the request. The multicast network may make sure that packets sent to multicast group are received by all the joined clients.

In another embodiment, the client 1704 and server 1702 may be connected via a unicast network. A server may send all the packets destined for a particular logical channel to a particular unicast address and a particular port. The client may join a particular logical channel by sending a request to receive any packets received by a particular server on a particular port address. The server may make sure that all packets received on a particular port address are copied and sent to all clients that have sent request messages to receive such packets, and thus the server may be an active agent in making the bindings between logical and physical channels.

In another embodiment, the server 1702 may be connected to the client 1704 via a broadcast network, such as a satellite network. The client 1704 may tune its receiver to receive a particular subset of physical channels or receive a single physical channel and filter out all the data except for a particular subset of logical channels, or a combination thereof. In one direction, the physical channel may be a satellite uplink from the server 1702 to the network, while the client channel may be a terrestrial link to a local switch in the network. Similarly, the server channels 1710 from the network 1706 to the server 1702 may be terrestrial links, while the server channels 1710 from the server 1702 to the network 1706 may be satellite based. Unless otherwise indicated, where multicasting is referred to herein as a mechanism for scaling the required server and network bandwidths, it should be understood that broadcasting could be used as well.

The logical channels are each shown as bi-directional. Requests may flow from clients 1704 towards a server 1702, files may flow from input file storage 1701 and/or input file stream 1705 to a server 1702, served file data may flow from a server 1702 to clients 1704 and files may flow from clients 1704 to their associated input file storage devices 1720.

It is to be understood that the various functional blocks in FIG. 17 may be implemented by a combination of hardware and/or software, and that in specific implementations some or all of the functionality of some of the blocks may be combined. Similarly, it is also to be understood that the various methods discussed herein may be implemented by a combination of hardware and/or software.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of serving a content item from a content server to multiple clients via a network, the method comprising:
   maintaining concurrent independent sessions between a content server and each of a plurality of clients for conveying the content item to each of the plurality of clients, wherein the number of clients in the plurality of clients can vary over time, and wherein the start of at least one session and the end of at least one session is independent of the start and end of other sessions;
   receiving a stream of packet payloads by the content server, each packet payload of the stream of packet payloads including a set of output symbols encoded with data generated from the content item, wherein each packet payload in at least a subset of the stream of packet payloads includes output symbols distinct from any output symbols included in any other packet payload of the stream of packet payloads; and
   transmitting concurrently from the content server each packet payload of the stream of packet payloads to each client of the plurality of clients in corresponding packets, wherein each packet payload transmitted concurrently at any particular time to some or all of the plurality of clients is independent of which packet payloads had been previously correctly received by various ones of the clients, and wherein each of the plurality of clients is capable of reconstructing the content item after correctly receiving a number of different output symbols sufficient in quantity to reconstruct the data generated from the content item to a desired accuracy from those different output symbols.

2. The method of claim 1, wherein the data generated from the content item comprises an ordered set of input symbols, wherein each packet payload of the stream of packet payloads includes at least one output symbol, wherein output symbols are generated from input symbols, and wherein a client can regenerate the ordered set of input symbols to a desired accuracy from the output symbols included in a set of packet payloads received by the client.

3. The method of claim 2, wherein the set of packet payloads received by the client can be received via a plurality of distinct sessions.

4. The method of claim 1, wherein the packets are unicast packets.

5. The method of claim 4, wherein the unicast packets are UDP unicast packets or TCP packets.

6. The method of claim 1, further comprising maintaining a list of the plurality of clients.

7. The method of claim 6, further comprising:
   receiving, via the network, either a first message from a new client not included in the list requesting to be added to the list, or a second message from an existing client included in the list requesting to be removed from the list;

adding the new client to the list if the first message was received; and removing the existing client from the list if the second message was received.

8. An apparatus for serving content to multiple clients via a network, the apparatus comprising:
- a client manager coupled to the network that maintains concurrent independent sessions with each of a plurality of clients;
- a buffer coupled to the network to receive a stream of packet payloads, each packet payload of the stream of packet payloads including a set of output symbols encoded with data generated from a content item, wherein each packet payload in at least a subset of the stream of packet payloads includes output symbols distinct from any output symbols included in any other packet payload of the stream of packet payloads;
- a replication engine coupled to the buffer that, for each packet payload, generates a plurality of packets that include the packet payload, each packet of the plurality of packets corresponding to one of the plurality of clients; and
- a transmitter coupled to the replication engine that receives the packets and transmits concurrently the packets to the corresponding clients via the network;
- wherein each packet payload transmitted concurrently at any particular time to some or all of the plurality of clients is independent of which packet payloads had been previously correctly received by various ones of the clients, and wherein each of the plurality of client is capable of reconstructing the content item after correctly receiving a number of different output symbols sufficient in quantity to reconstruct the data to a desired accuracy from those different output symbols.

9. The apparatus of claim 8, further comprising a memory coupled to the client manager for maintaining a list of the plurality of clients.

10. The apparatus of claim 9, further comprising a connection manager coupled with the network and with the memory, the connection manager configured to receive a request to add a new client to the list and configured to add the new client to the list, and configured to receive a request to remove an existing client from the list and configured to remove the existing client from the list.

11. The apparatus of claim 8, wherein the client manager is configured to receive a packet lost message from one of the plurality of clients, the packet lost message indicating the one of the plurality of clients did not receive a packet that included one of the plurality of packet payloads, and, in response to the packet lost message, cause the replication engine to generate another packet to replace the lost packet, wherein the payload of the another packet includes output symbols distinct from any output symbols included in the packet payload that the client did not receive.

12. The apparatus of claim 8, wherein the client manager maintains concurrent independent channel connections within a session with each of a first plurality of clients and each of a second plurality of clients;
- wherein the stream of packet payloads includes a first stream of packet payloads on a first channel and a second stream of packet payloads on a second channel, wherein each packet payload of the first stream of packet payloads includes data comprising a first subset of the content item to be transferred to the first plurality of clients, wherein each packet payload of the second stream of packet payloads includes data comprising a second subset of the content item to be transferred to the second plurality of clients; and
- wherein the replication engine, for each packet payload in the first stream, generates a first plurality of packets that include the packet payload, each packet of the first plurality of packets corresponding to one of the first plurality of clients, and wherein, for each packet payload in the second stream, generates a second plurality of packets that include the packet payload, each packet of the second plurality of packets corresponding to one of the second plurality of clients.

13. A computer-readable medium, for use with a content server capable of serving content to multiple clients via a network, the computer-readable medium comprising non-transitory storage for program code, executable, directly or indirectly, by a content server, the non-transitory storage having stored thereon:
- program code for maintaining concurrent independent sessions between a content server and each of a plurality of clients for conveying a content item to each of the plurality of clients, wherein the number of clients in the plurality of clients can vary over time, and wherein the start of at least one session and the end of at least one session is independent of the start and end of other sessions;
- program code for receiving a stream of packet payloads by the content server, each packet payload of the stream of packet payloads including a set of output symbols encoded with data generated from the content item, wherein each packet payload in at least a subset of the stream of packet payloads includes output symbols distinct from any output symbols included in any other packet payload of the stream of packet payloads; and
- program code for transmitting concurrently from the content server each packet payload of the stream of packet payloads to each client of the plurality of clients in corresponding packets, wherein each packet payload transmitted concurrently at any particular time to some or all of the plurality of clients is independent of which packet payloads had been previously correctly received by various ones of the clients, and wherein each of the plurality of clients is capable of reconstructing the content item after correctly receiving a number of different output symbols sufficient in quantity to reconstruct the data generated from the content item to a desired accuracy from those different output symbols.

14. The computer-readable medium of claim 13, wherein the non-transitory storage further has stored thereon program code for maintaining a list of the plurality of clients.

15. The computer-readable medium of claim 14, wherein the non-transitory storage further has stored thereon:
- program code for receiving, via the network, either a first message from a new client not included in the list requesting to be added to the list, or a second message from an existing client included in the list requesting to be removed from the list;
- program code for adding the new client to the list if the first message was received; and
- program code for removing the existing client from the list if the second message was received.

16. The computer-readable medium of claim 13, wherein the program code for maintaining concurrent independent sessions with each of the plurality of clients includes program code for maintaining concurrent independent channel connections within a session with each of a first plurality of clients and with each of a second plurality of clients;

wherein the program code for receiving a stream of packet payloads includes program code for receiving a first stream of packet payloads on a first channel and a second stream of packet payloads on a second channel, wherein each packet payload of the first stream of packet payloads includes data comprising a first subset of the content to be transferred to the first plurality of clients, wherein each packet payload of the second stream of packet payloads includes data comprising a second subset of the content to be transferred to the second plurality of clients; and wherein the program code for transmitting concurrently each packet payload of the stream of packet payloads includes program code for transmitting concurrently each packet payload in the first stream of packet payloads to each client of the first plurality of clients in corresponding packets, and transmitting concurrently each packet payload in the second stream of packet payloads to each client of the second plurality of clients in corresponding packets.

17. The computer-readable medium of claim 16, wherein the first subset of the content and the second subset of the content are different subsets of the content.

18. The computer-readable medium of claim 13, wherein the non-transitory storage further has stored thereon:

program code for maintaining a multicast session, wherein a plurality of multicast clients can join the multicast session, wherein the number of the plurality of multicast clients joined to the multicast session can vary over time; and program code for transmitting concurrently, via a multicast network, each packet payload of the stream of packet payloads to each multicast client of the plurality of multicast clients in corresponding multicast packets.

19. An apparatus for serving a content item from a content server to multiple clients via a network, the apparatus comprising:

means for maintaining concurrent independent sessions between a content server and each of a plurality of clients for conveying the content item to each of the plurality of clients, wherein the number of clients in the plurality of clients can vary over time, and wherein the start of at least one session and the end of at least one session is independent of the start and end of other sessions;

means for receiving a stream of packet payloads by the content server, each packet payload of the stream of packet payloads including a set of output symbols encoded with data generated from the content item, wherein each packet payload in at least a subset of the stream of packet payloads includes output symbols distinct from any output symbols included in any other packet payload of the stream of packet payloads; and means for transmitting concurrently from the content server each packet payload of the stream of packet payloads to each client of the plurality of clients in corresponding packets, wherein each packet payload transmitted concurrently at any particular time to some or all of the plurality of clients is independent of which packet payloads had been previously correctly received by various ones of the clients, and wherein each of the plurality of clients is capable of reconstructing the content item after correctly receiving a number of different output symbols sufficient in quantity to reconstruct the data generated from the content item to a desired accuracy from those different output symbols.

20. An apparatus for serving a content item to multiple clients via a network, the network including a multicast network, the apparatus comprising:

a client manager coupled to the network that maintains concurrent independent sessions with each of a plurality of unicast clients, wherein the start of at least one session and the end of at least one session is independent of the start and end of other sessions;

a storage device coupled to the network that stores the content item to be served;

an encoding system coupled to the storage device that generates a stream of packet payloads, each packet payload of the stream of packet payloads including a set of output symbols encoded with data comprising the content item to be served to the plurality of unicast clients and a plurality of multicast clients, wherein each packet payload in at least a subset of the stream of packet payloads includes output symbols distinct from any output symbols included in any other packet payload of the stream of packet payloads, wherein at least a first subset of the packet payloads are included in multicast packets;

a multicast transmitter coupled with the encoding generator and the network that receives the multicast packets from the encoding system and transmits concurrently the multicast packets to a plurality of multicast clients via the multicast network;

a replication engine coupled to the encoding system that receives at least a second subset of the packet payloads in the stream of packet payloads, and that, for each received packet payload, generates a plurality of unicast packets that include the received packet payload, each unicast packet of the plurality of unicast packets corresponding to one of the plurality of unicast clients; and a unicast transmitter coupled to the replicator engine that receives the unicast packets and transmits concurrently the packets to the corresponding unicast clients via the network;

wherein each multicast packet or unicast packet transmitted concurrently at any particular time to some or all of the plurality of multicast clients or the plurality of unicast clients is independent of which multicast packet or unicast packet had been previously correctly received by various ones of the multicast clients or unicast clients, and wherein each of the plurality of multicast clients or unicast clients is capable of reconstructing the content item after correctly receiving a number of different output symbols sufficient in quantity to reconstruct the data to a desired accuracy from those different output symbols.

* * * * *